US008644295B2

(12) United States Patent
Streed et al.

(10) Patent No.: US 8,644,295 B2
(45) Date of Patent: Feb. 4, 2014

(54) METHODS FOR FADE DETECTION AND FADE RECOVERY IN A WIRELESS COMMUNICATION SYSTEM

(75) Inventors: James E. Streed, Barrington, IL (US); Harish Natarahjan, Streamwood, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 610 days.

(21) Appl. No.: 12/771,139

(22) Filed: Apr. 30, 2010

(65) Prior Publication Data

US 2011/0267939 A1 Nov. 3, 2011

(51) Int. Cl.
*H04W 56/00* (2009.01)
(52) U.S. Cl.
USPC .......................................... 370/350; 370/347
(58) Field of Classification Search
None
See application file for complete search history.

(56) References Cited

U.S. PATENT DOCUMENTS

| 3,813,496 | A | | 5/1974 | Maillet |
|---|---|---|---|---|
| 5,513,183 | A | | 4/1996 | Kay et al. |
| 6,088,588 | A | * | 7/2000 | Osborne ................. 455/425 |
| 6,363,055 | B1 | | 3/2002 | Sasson |
| 6,489,803 | B1 | | 12/2002 | Steiner et al. |
| 7,318,185 | B2 | | 1/2008 | Khandani et al. |
| 2002/0068572 | A1 | * | 6/2002 | Chun et al. ............ 455/442 |
| 2003/0043761 | A1 | * | 3/2003 | Hladik ................... 370/319 |
| 2003/0185167 | A1 | | 10/2003 | Paneth et al. |
| 2005/0124334 | A1 | | 6/2005 | Rajkotia |
| 2006/0013188 | A1 | | 1/2006 | Wiatrowski et al. |
| 2007/0207750 | A1 | | 9/2007 | Brown et al. |
| 2010/0098051 | A1 | | 4/2010 | Uemura |
| 2011/0032429 | A1 | | 2/2011 | Bing |
| 2012/0106536 | A1 | | 5/2012 | Natarahjan et al. |
| 2012/0134353 | A1 | | 5/2012 | Streed et al. |

FOREIGN PATENT DOCUMENTS

DE 19818514 A1 11/1999

OTHER PUBLICATIONS

Non Final Office Action mailed Jan. 4, 2013 in related U.S. Appl. No. 12/957,072, James E. Streed, filed Nov. 30, 2010.
International Search Report and Written Opinion International Patent Application No. PCT/US20011059934 issued on Aug. 17, 2012 for related U.S. Appl. No. 12/957,072.
US Office Action dated Jan. 4, 2013 for U.S. Appl. No. 12/957,072.

* cited by examiner

*Primary Examiner* — John Blanton
*Assistant Examiner* — Alan Lindenbaum
(74) *Attorney, Agent, or Firm* — Randi L. Karpinia; Daniel R. Bestor

(57) ABSTRACT

Methods are provided for fade protection at infrastructure equipment in a wireless communication network. The disclosed fade protection methods quantify signal quality, and based on the signal quality can detect fade conditions and/or recovery from such fade conditions. In one implementation, the disclosed fade protection methods can be implemented at Fixed Network Equipment (FNE) in an Association of Public-Safety Communications Officials (APCO) Project 25 (P25) compliant system.

20 Claims, 13 Drawing Sheets

METHODS FOR FADE DETECTION AND FADE RECOVERY IN A WIRELESS COMMUNICATION SYSTEM

FIELD OF THE DISCLOSURE

The present disclosure relates generally to wireless communication, and more particularly to methods for fade detection, fade recovery and/or fade protection in a wireless communication system.

BACKGROUND

As public safety agencies and other organizations evaluate their two-way radio needs for the future, a number of possible solutions are available, including the digital radio technologies that are now available.

For instance, the Association of Public-Safety Communications Officials (APCO) Project 25 (P25) (or APCO-25) represents one effort to set standards for digital two-way radio technology. In general, P25 refers to a suite of narrowband digital Land Mobile Radio (LMR) communication standards for digital radio communications, equipment and systems. P25 standards are produced through the joint efforts of the Association of Public Safety Communications Officials International (APCO), the National Association of State Telecommunications Directors (NASTD), selected Federal Agencies and the National Communications System (NCS), and standardized under the Telecommunications Industry Association (TIA). P25 technology and products are not limited to public safety alone and have also been selected for other private system applications.

P25 standards specify a Common Air Interface (CAI) that defines the type and content of signals transmitted by P25-compliant radios. P25-compliant radios can communicate directly with each other in "talk around" mode without any intervening equipment between two radios, or in conventional mode where a requesting radio chooses the channel to talk on and two radios communicate through a repeater or base station without trunking. In addition, two radios may communicate in a trunked mode where infrastructure equipment dynamically assigns the requesting radio a channel to talk on and traffic is automatically assigned to one or more voice channels by a Repeater or Base Station. Further details regarding the P25 standards can be obtained from the Telecommunications Industry Association, 2500 Wilson Boulevard, Suite 300 Arlington, Va. 22201.

P25-compliant technology is being deployed in several phases commonly referred to as Phase 1 and Phase 2. Phase 2 is currently under development to improve spectrum utilization. Among other changes to the Phase 1 standard, the Phase 2 standard proposes significant changes to the CAI. One of the major changes is the migration from an FDMA-based channel access scheme to a TDMA-based channel access scheme.

In any wireless communication system, radio signals are subject to wide power level variations over time due to shadowing, fading, change in distance between a mobile radio and a base radio, etc., and thus exhibit signal quality variations with respect to the communication links used for communicating between them. As such, in any wireless communication network, it is important to provide a mechanism for infrastructure equipment to determine when a call (or communication session) has ended so that communication resources assigned to that call can used by other mobile stations.

In some wireless communication systems, when a mobile radio completes a transmission it can transmit an explicit termination instruction (sometimes called an end-of-call message) to infrastructure equipment. In response the infrastructure equipment terminates the call, and the communication channel and other resources may then be made available for other calls.

In a wireless communication network, any condition where the radio signal strength weakens to the point where radio communications are affected can be referred to as "fading." Fading can be due to short term variations in radio signals (e.g., Raleigh fading), or due to an increase in distance between the transmitting radio and the receiving radio. For instance, in some cases a mobile station does not intend to end its call, but moves out of range of the base station that it is communicating with. Because the mobile station does not intend to end the call, an end-of-call message is not transmitted, and hence the infrastructure equipment (e.g., base station) does not receive an explicit end-of-call message from that mobile radio. In other cases, the mobile station might transmit an end-of-call indication, but it may not be received by the infrastructure equipment or might, for example, contain too many errors to be decoded correctly.

When such fade conditions occur, the infrastructure equipment should nevertheless be able to detect and confirm that the call has ended, and if so, terminate the call and free up any communication resources assigned to the particular mobile radio involved in that call. At the same time, because fading happens regularly in a wireless environment, it is desirable for the infrastructure equipment not to prematurely drop a call just because a temporary fade condition has been detected. In the event a call is prematurely dropped due to fading and the mobile station is still within the coverage area of the infrastructure equipment, the infrastructure equipment should also be able to resume the call as soon as possible.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
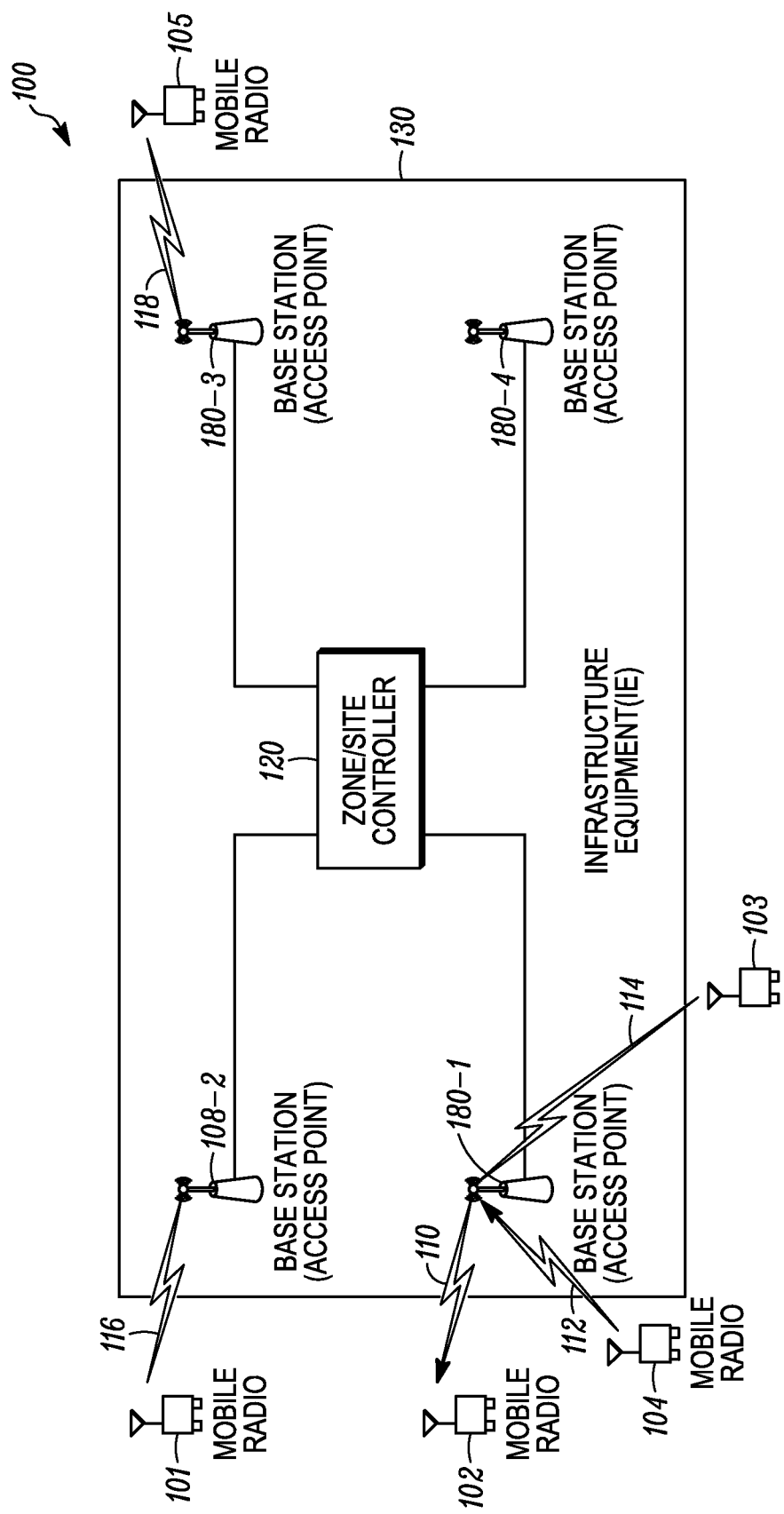
FIG. 1 illustrates a wireless communication system in which various embodiments of the present invention can be implemented.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Fade protection methods are provided that can be used to end a call even though an explicit instruction has not been received from a mobile radio at infrastructure equipment. Such fade protection methods include fade detection methods and fade recovery methods.

In fade detection, infrastructure equipment monitors incoming signal quality from a mobile radio and uses this to determine whether the signal quality is indicative of a fade condition. When a fade condition is detected, the infrastructure equipment starts a fade timer, and then continues to monitor incoming signal quality from that mobile radio until the fade timer is stopped and reset (signaling a fade recovery event) or expires (signaling an end of call event).

When a detected fade condition is not fatal, the fade recovery mode allows for the communication resources dedicated to the mobile radio to be maintained at the infrastructure equipment. For example, if the signal quality begins to indicate that the fade condition is no longer present, then the mobile radio has "recovered" from the fade condition. However, if the fade condition persists for a certain time period (e.g., the fade timer runs for a certain time period without any indication that the mobile radio has recovered from the fade condition), then it is assumed that the mobile radio can not recover from the fade, and the infrastructure equipment ends the call and frees up any communication resources allocated to that call. If the fade condition ends prior to expiration of the certain time period, then it is assumed that the mobile radio has recovered from the fade condition, and the infrastructure equipment maintains communication resources dedicated to that mobile radio.

In one embodiment, bursts of information are received at infrastructure equipment (IE) from a mobile radio over a common air interface. The bursts comprise either voice bursts or Inbound Encoded MAC Information (IEMI) bursts. Each voice burst comprises voice frames (e.g., two voice frames for a 2V burst and four voice frames for a 4V burst). The IEMI bursts include signaling information. Each IEMI burst may be a fast access control channel (FACCH) burst, a random access slow access control channel (SACCH) burst or a non-random access SACCH burst. Each voice burst received from the mobile radio is decoded, and the number of bit errors in each voice frame of that voice burst are computed and stored in a voice frame error counter buffer (VFECB).

In this embodiment, during a fade detection mode, a first summed number of bit errors ($E_d$) that were present in a first number ($N_d$) of most recent voice frames is stored in the VFECB. When it is determined that a fade timer is not running and that a current value of the first summed number ($E_d$) is greater than a fade detection threshold ($T_d$), the IE determines that a fade condition is detected and starts the fade timer to begin timing the duration of the fade condition. With respect to the fade timer, it is noted that the fade timer runs for a duration until the fade timer expires, and starts whenever a fade condition is detected. The fade timer continues to run unless the mobile radio recovers from the fade condition. In addition, it is noted that upon receiving each voice burst, the IE determines whether the fade timer has expired, and if so, the IE terminates the call involving the mobile radio.

In one implementation of this embodiment, when the fade condition is detected, the IE continues to transmit null voice frames with canned control signaling information until the mobile radio has either recovered from the fade condition or the fade timer stops or expires. In this manner, mobile radios can maintain voice framing.

In this embodiment, during a fade recovery mode, the IE determines a second summed number of bit errors ($E_r$) that were present in a second number ($N_r$) of most recent voice frames stored in the VFECB while the fade timer has been running. When the IE determines that the fade timer is running and that the second summed number of bit errors ($E_r$) that were present in the second number ($N_r$) of most recent voice frames is less than a fade recovery threshold ($T_r$), the IE stops and resets the fade timer to indicate that the mobile radio has recovered from the fade condition and that the call is still in progress and will resume.

In one implementation of this embodiment, when the fade timer remains running, but has not yet expired, the IE continues to transmit null voice frames with canned control signaling information so that the receiving mobile radios maintain voice framing, and continues until the mobile radio has recovered from the fade condition or the fade timer stops or the fade timer expires.

With respect to each IEMI burst that is received, the IE determines its burst type (i.e., FACCH burst, non-random access SACCH burst, or random access SACCH burst). In one implementation of this embodiment, the IE determines, with respect to each random access SACCH burst, whether the fade timer has expired, and if so, terminates the call involving the mobile radio.

The IE also decodes each IEMI burst that is determined to be a FACCH burst or a non-random access SACCH burst, and determines whether decoding of that FACCH burst or that non-random access SACCH burst was successful. If decoding was unsuccessful, the IE determines whether the fade timer has expired, and if so, terminates the call involving the mobile radio. By contrast, if decoding was successful, the IE clears its VFECB, and then determines whether that FACCH burst or that non-random access SACCH burst is an end-of-call indicator. If not, the IE determines that the fade timer is running, and if the fade timer is running, the IE stops and resets the fade timer, and then processes the next burst received from the mobile radio.

In another embodiment, the IE receives bursts of information from a mobile radio as part of a call involving the mobile radio over a common air interface. Each burst includes a data unit identifier (DUID) that indicates a burst type. The burst can be voice bursts or IEMI bursts that include signaling information. For each burst received, the IE determines whether the DUID for that burst is valid or in error. As used herein, DUIDs that are in error are referred to as "errored DUIDs." To maintain a DUID error count, the IE increments a DUID error counter buffer (DECB) that stores a most recent number of the errored DUIDs each time a DUID is determined to be in error.

The IE can then determine a first summed number ($D_d$) of errored DUIDs that were present in a first number ($K_d$) of most recent bursts stored in the DECB. The IE then determines whether a fade timer is running, and if not, performs fade detection processing. During fade detection processing, the IE determines that a fade condition is detected when a current value of the first summed number ($D_d$) is determined to be greater than a fade detection threshold ($T_d$), and starts the fade timer to begin timing the duration of the fade condition.

In one implementation of this embodiment, the IE can determine whether the fade timer has expired each time it receive a voice burst, and if so, can terminate the call involving the mobile radio.

In fade recovery mode, the IE can also determine a second summed number ($D_r$) of errored DUIDs that were present in a second number ($K_r$) of most recent bursts stored in the DECB while the fade timer has been running. When the IE determines that the fade timer is running and that a current value of the second summed number ($D_r$) of errored DUIDs that were present in the second number ($K_r$) of most recent bursts is less than a fade recovery threshold ($T_r$), the IE stops and resets the fade timer to indicate that the mobile radio has recovered from the fade condition and that the call involving the mobile radio will continue.

In one implementation of this embodiment, the IE can determine, with respect to each random access SACCH burst, whether the fade timer has expired, and if so, can terminate the call involving the mobile radio.

In one implementation of this embodiment, the IE can decode each IEMI burst that is determined to be a FACCH burst or a non-random access SACCH burst, and determine whether decoding of that FACCH burst or that non-random access SACCH burst was successful.

When decoding of that FACCH burst or that non-random access SACCH burst was successful, the IE can clear its DECB and determine whether that FACCH burst or that non-random access SACCH burst is an end-of-call indicator. When that FACCH burst or that non-random access SACCH burst is not an end-of-call indicator, the IE determines whether the fade timer is running, and stops it if it is running.

By contrast, when decoding of that FACCH burst or that non-random access SACCH burst was not successful, the IE determine whether the fade timer has expired, and if so, terminates the call involving the mobile radio.

In yet another embodiment, the IE decodes each burst that is determined to be a non-random access SACCH burst, and determines whether decoding of each non-random access SACCH burst was successful. Each time decoding a non-random access SACCH burst is unsuccessful, the IE determines whether a fade timer is running. When the fade timer is not running, the IE increments a missed SACCH counter that stores a number ($M_d$) of consecutive non-random access SACCH bursts that were not successfully decoded. The IE then performs fade detection processing. When the number ($M_d$) of consecutive non-random access SACCH bursts that were not successfully decoded is determined to be greater than a fade detection threshold ($T_d$), the IE determines that a fade condition is detected and starts the fade timer to begin timing a duration of the fade condition.

When the IE determines that the fade timer is running, the IE determines whether the fade timer has expired, and if so, terminates the call involving the mobile radio. In addition, for each burst that is determined not to be a SACCH burst, the IE determines whether the fade timer has expired, and if so, terminates the call involving the mobile radio.

When decoding of that non-random access SACCH burst was successful, the IE clears the missed SACCH counter, and then determines, with respect to each IEMI burst that is determined to be a non-random access SACCH burst, whether that non-random access SACCH burst is an end-of-call indicator. When the non-random access SACCH burst is determined not to be an end-of-call message, the IE performs fade recovery processing. The IE determines whether the fade timer is running, and stops and resets the fade timer if the fade timer is running to indicate that the mobile radio has recovered from the fade condition and that the call involving the mobile radio will continue.

With respect to each random access SACCH burst, the IE determines whether the fade timer has expired, and if so, terminates the call involving the mobile radio.

According to some embodiments, fade protection, fade detection and fade recovery methods described above can be used in wireless communication systems, such as Project 25, Phase 2 compliant communication systems, and can be implemented at Fixed Network Equipment (FNE) to detect and/or recover from a fade condition. As will be described below, these fade protection methods balance two conflicting performance requirements of speed and reliability. In some embodiments, these methods can also reduce "lost" audio voice frames upon recovery from a fade condition.

FIG. 1 illustrates a wireless communication system 100 in which various embodiments of the present invention can be implemented. The wireless communication system 100 comprises a plurality of communications devices such as the illustrated mobile radios 101-105, which may be, for example, a portable radio, a personal digital assistant, a cellular telephone, a video terminal, a portable computer with a wireless modem, or any other wireless communication device. For purposes of the following discussions, the communication devices will be referred to as "mobile radios," but they are also referred to in the art as subscriber units, mobile stations, mobile equipment, handsets, mobile subscribers, or an equivalent.

As illustrated, for example, the mobile radios 101-105 communicate over wireless communication links 110, 112, 114, 116, 118 with infrastructure equipment (IE) 130 that can be part of an access network. The IE 130 may also be referred to as Fixed Network Equipment (FNE). Those of ordinary skill in the art will appreciate that any type of wireless communication network is within the scope of the teachings herein. Thus, the IE 130 can comprise infrastructure such as, but not limited to, base stations (BS) (with four BSs 108-1 . . . 108-4 shown for clarity) that operate under control of a call controller 120 that controls trunking resources, sometimes referred to as a zone or site controller. The IE 130 can also include other elements such as switches, BS controllers (not shown), network elements (such as, a mobile switching center, home location register, visitor location register, a console operator position, etc.), and the like, to facilitate the communications between mobile radios 101-105 having access to the IE 130. It will be appreciated by those of ordinary skill in the art that the IE 130 and mobile radios 101-105 can be part of a wide area network (WAN) that is distributed over a wide area that spans multiple access networks.

For example, in some implementations, the mobile radios 101-105 can communicate with each other through BSs 108. As is known by one of ordinary skill in the art, BS 108 generally comprises one or more repeater devices that can receive a signal from a transmitting mobile radio over one wireless link and re-transmit to listening mobile radios over different wireless links. For example, mobile radio 102 can transmit over link 110 to BS 108-1 and BS 108-1 can re-transmit the signal to listening mobile radios 103 and 104 over wireless links 114 and 112, respectively. BS 108 can also receive a signal from mobile radio 103 over wireless link 114 and re-transmit the signal to mobile radios 102 and 104 over wireless links 110 and 112, respectively. Alternately, BS 108 can receive a signal from mobile radio 104 over wireless link 112 and re-transmit the signal to mobile radios 102 and 103 over wireless links 110 and 114, respectively. In addition, mobile radio 105 may communicate with the other mobile radios in other "zones." For ease of illustration, only five mobile radios and four BSs are shown. However, those skilled in the art will appreciate that a typical system can include any number of mobile radios, any number of Base Stations, any number of Base Controllers, and any number of other network elements. Moreover, although in this embodiment communication between mobile radios 101-105 are illustrated as being facilitated by BS 108, mobile radios 101-105 can communicate directly with each other using a direct mode of operation without BSs when they are in communication range of each other.

Figure 2:
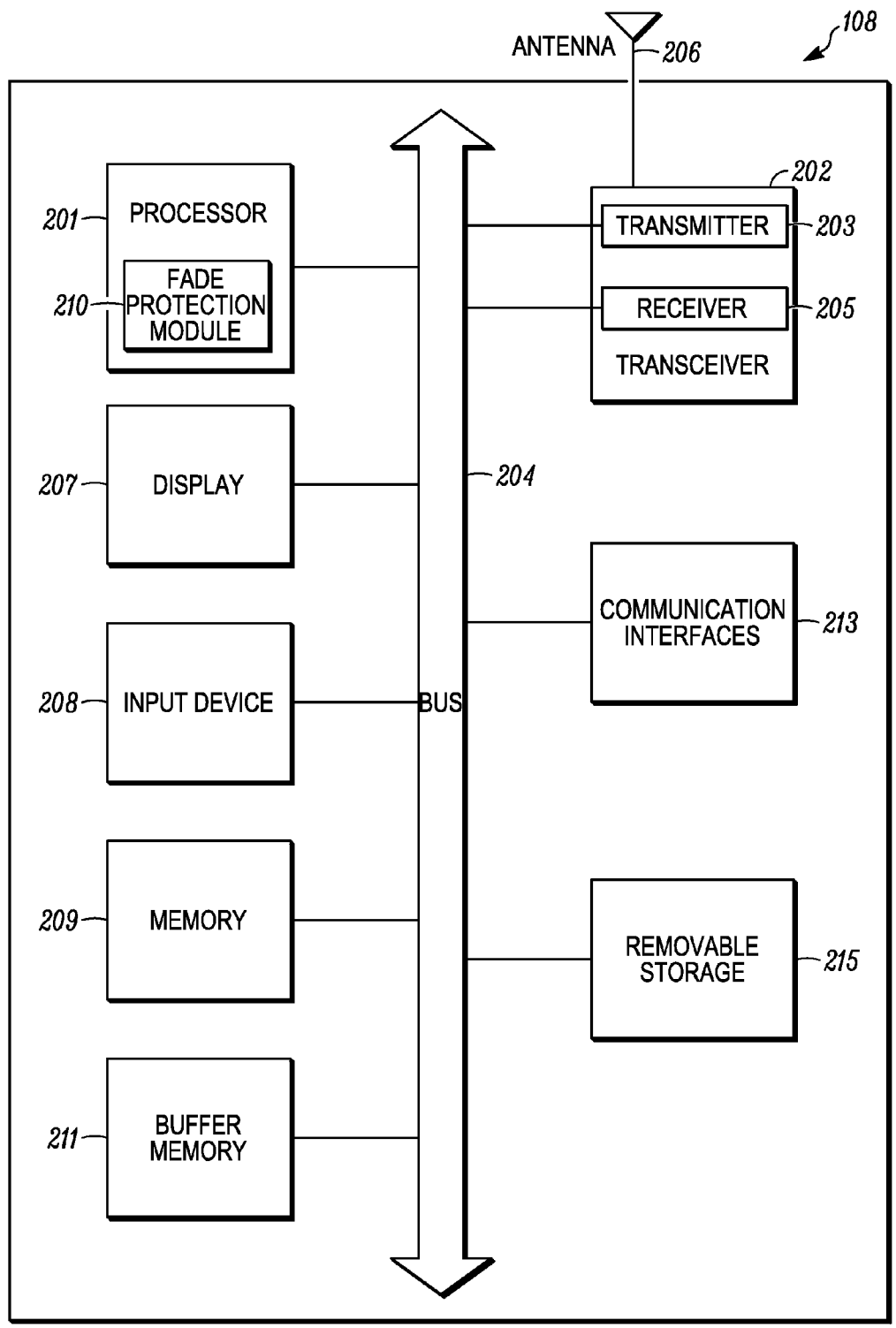
FIG. 2 is a block diagram of infrastructure equipment in which various embodiments of the present invention can be implemented.

Since network 100 is a wireless network, meaning that it supports a wireless or air interface protocol for signal transmission, the mobile radios 101-105, and BS 108, comprise transceivers that include a transmitter and a receiver for transmitting and receiving radio frequency (RF) signals, respectively, as illustrated in FIG. 2. In this regard, both the mobile radios 101-105, and the BSs 108, further comprise one or more processing devices (such as microprocessors, digital signal processors, customized processors, field programmable gate arrays (FPGAs), unique stored program instructions (including both software and firmware), state machines, and the like.) and memory elements for performing (among other functionality) the air interface protocol and channel access scheme supported by network 100. As will be described below, using these protocols, mobile radios 101-105 can each generate RF signals that include bursts of information comprising a plurality of fields for organizing the continuous bits of information and/or signaling for transmission to another mobile radio.

While one embodiment of a communication system 100 is described with regards to FIG. 1, those skilled in the art will appreciate that the specifics of this illustrative example are not specifics of the disclosure itself and that the teachings set forth herein are applicable in a variety of alternative settings. For example, since the teachings described do not depend on the type of air interface protocol or channel access scheme used (e.g., Time Division Multiple Access (TDMA), Code Division Multiple Access (CDMA), Frequency Division Multiple Access (FDMA), and the like), the teachings can be applied to any type of air interface protocol and channel access scheme. The teachings herein can also be applied with any system and with any protocol utilizing wired links. As such, other alternative implementations using different types of wired or wireless protocols and channel access schemes are contemplated and are within the scope of the various teachings described.

Voice Call Phases

A two-way radio channel can be in an idle state or an active state. The channel is in the idle state when the channel is not assigned to a call. The channel is in the active state when the channel is assigned to a call.

During the active state a voice call on an active two-way radio channel may move through a number of phases that can be referred to as a setup phase, a speech phase, a suspended phase, a hangtime phase and a termination phase.

In the setup phase, channel access is requested and granted, and all call participants are summoned to the channel. The setup phase also includes mobile radio synchronization to the channel.

Voice communication takes place during the speech phase. If the flow of speech is interrupted for an extended period of time during the call, but the call has not completed (e.g., the radio signal fades temporarily), the call is in the suspended phase.

When the transmitting mobile radio completes its transmission, the call is in the hangtime phase. During this phase, other participants in the call may request to talk on the same channel. The hangtime phase ensures continuity in a radio conversation because subsequent requestors do not have to wait for a new channel assignment.

When the conversation has ended, the call is in the termination phase. During the termination phase, the channel resources are released and made available for another call.

P25 Phase 2 Inbound Traffic Channel Structure

In some implementations, the mobile radios 101-105 can communicate using a traffic channel such as that described in the P25 standards. More specifically, the P25 Phase 2 Media Access Control (MAC) standard defines a bi-directional channel, which is used to exchange voice and signaling blocks between the IE 130 and one or several mobile radios 101-105.

In particular, the Project 25 Phase 2 common air interface is comprised of a control channel (CCH) interface and a traffic channel (TCH) interface. The traffic channel interface has an inbound (mobile radio to base radio) and an outbound (base radio to mobile radio) interface. The inbound and outbound TCH interfaces share many common structures, but they are not identical.

The inbound traffic channel is subdivided in time into ultraframes 1440 ms long. An ultraframe is a set of four consecutive 360 millisecond (ms) superframes and therefore covers a 1.44 second time interval. Each superframe is comprised of twelve 30 ms time slots, numbered sequentially from 0 to 11. More specifically, each superframe is a set of 2*6 timeslots of 30 ms each for two-slot TDMA, i.e. 360 ms. The inbound traffic channel is logically subdivided into two voice channels (VCH 0 and VCH 1). VCH 0 occupies six time slots: 0, 2, 4, 6, 8, and 11. VCH 1 occupies six time slots: 1, 3, 5, 7, 9, and 10.

Each voice channel contains two logical sub-channels for signaling information: the slow access control channel (SACCH) and the fast access control channel (FACCH). The P25 Phase 2 MAC standard defines the FACCH as a signaling channel using slots normally assigned to voice on the voice channel (VCH). The FACCH is normally used for call establishment, hang-time, and teardown signaling. Further, the P25 Phase 2 MAC standard defines the SACCH as a periodic bi-directional logical channel on the VCH, which is used to exchange signaling or data information between the Fixed Network Equipment (FNE) and one or several mobile radios (MRs) assigned to the corresponding voice logical channel. All signaling is contained in Protocol Data Units (PDUs); some PDUs have the facility to carry a plurality of individual signaling messages.

An Inbound SACCH is used to convey call specific signaling, including information regarding current channel users and current call type, call interrupt requests from listening radios, and call continuation requests during hang time. One SACCH per logical voice channel occurs every twelve slots, which is commonly known as a superframe. An inbound SACCH burst carries a synchronization (SYNC) pattern. The SACCH burst may be scrambled or un-scrambled. Inbound SACCH Signaling includes: random access (RA) SACCH signaling (e.g., listening radio signaling) and non-RA SACCH signaling (e.g., transmitting radio signaling). The SACCH for VCH 0 occupies time slot 11 of every superframe; the SACCH for VCH 1 occupies time slot 10 of every superframe.

In the first three superframes of an ultraframe, the transmitting mobile radio transmits signaling information in the SACCH. In the last superframe of an ultraframe, any mobile radio participating in the call may transmit signaling information (e.g., a request to interrupt the call). This last SACCH timeslot in an ultraframe is called the Random Access SACCH (RA-SACCH).

The FACCH for VCH 0 occupies time slots 0, 2, 4, 6, and 8 when the call for VCH 0 is in the setup, hangtime, and termination phases; the FACCH for VCH 1 occupies time slots 1, 3, 5, 7, and 9 when the call on VCH 1 is in the setup, hangtime, and termination phases.

When a call for VCH 0 is in the speech phase, the FACCH is idle, and voice frames are sent in time slots 0, 2, 4, 6, and 8. When a call for VCH 1 is in the speech phase, the FACCH is idle, and voice frames are sent in time slots 1, 3, 5, 7, and 9.

A burst is the physical contents of a time slot. On the inbound traffic channel, a burst may either be an Inbound Encoded MAC Information (IEMI) burst or a voice burst. IEMI bursts may be either SACCH bursts or FACCH bursts. Voice bursts may contain either four voice frames (4V burst) or two voice frames (2V burst). Each superframe can include four 4V bursts, one 2V burst and one burst that includes voice channel signaling (in the SACCH).

Each burst contains a data unit identifier (DUID) which indicates the type of burst. A Data Unit Identifier (DUID) is used to indicate the type of burst communicated in a particular time slot, which can be either a voice burst or IEMI burst. There are two types of voice bursts that are referred to as a 4V burst and a 2V burst. Types of IEMI bursts include a SACCH burst with scrambling, a FACCH burst with scrambling, a SACCH burst without scrambling, or a FACCH burst without scrambling. A DUID is sent in all bursts (slots 0-11). Among other things the DUID can be used distinguish between the scrambled and un-scrambled SACCH and FACCH bursts.

The voice bursts on the voice channel have a particular sequence which is decoupled from the superframe time slot sequence. A superframe occupies 360 ms in time, and the superframe carries 360 ms of speech for a voice channel. A superframe contains 18 voice code words, and each voice codeword contains 20 ms of audio information (i.e., a superframe lasts for 360 ms in time, and it contains 360 ms of audio). Since one of the six time slots of a voice channel superframe is occupied by the SACCH, the remaining five time slots need to carry the 18 voice frames. The voice frames are sent in a 4V-4V-4V-4V-2V pattern. The pattern begins at the start of the speech phase, and the speech phase may start in any non-SACCH time slot on the voice channel. So the 2V burst is not restricted to a particular superframe time slot in the voice channel. For example, the 2V burst on VCH 0 may be in time slot 0, 2, 4, 6, or 8. Although each superframe contains four 4V bursts and one 2V burst, the time slot of the 2V burst is determined by when the call started, not by the start of the superframe.

Voice bursts also contain encryption synchronization signaling (ESS), used for encrypted communication. The ESS is split into two parts: ESS-A and ESS-B. ESS-A is distributed across the four 4V bursts, and ESS-B is contained in the following 2V burst. A 4V burst contains four 20 ms voice frames (80 ms of user speech) and encryption synchronization signaling (ESS-B); each voice frame is protected with a forward error correction code. A 2V burst contains two 20 ms voice frames (40 ms of user speech) and encryption synchronization signaling (ESS-A); each voice frame is protected with a forward error correction (FEC) code. For instance, in one implementation, the signal quality can be determined using the number of errors reported by the FEC decoder. A FEC decode failure (as indicated by the decoder) could be counted as a higher number of decoder errors (for example, as 5 errors when the maximum number of correctable errors is 3).

FIG. 2 is a block diagram of infrastructure equipment 108. The infrastructure equipment 108 comprises a processor 201, a transceiver 202 including a transmitter circuitry 203 and a receiver circuitry 205, an antenna 206, a display 207, an input device 208, a memory 209 for storing operating instructions that are executed by the processor 201, a buffer memory 211, one or more communication interfaces 213, and a removable storage unit 215. Although not shown, the infrastructure equipment 108 also can include an antenna switch, duplexer, circulator, or other highly isolative means (not shown) for intermittently providing information bursts or packets from the transmitter circuitry 203 to the antenna 206 and from the antenna 206 to the receiver circuitry 205.

The processor 201 can include one or more microprocessors, microcontrollers, DSPs (digital signal processors), state machines, logic circuitry, or any other device or devices that process information based on operational or programming instructions. Such operational or programming instructions can be, for example, stored in the memory 209. As will be described in greater detail below, the processor 201 can include a fade protection module 210 that is used to perform processing associated with fade protection methods that will be described below with reference to FIGS. 3-6.

The memory 209 may be an IC (integrated circuit) memory chip containing any form of RAM (random-access memory) or ROM (read-only memory), a floppy disk, a CD-ROM (compact disk read-only memory), a hard disk drive, a DVD (digital video disc), a flash memory card or any other medium for storing digital information.

One of ordinary skill in the art will recognize that when the processor 201 has one or more of its functions performed by a state machine or logic circuitry, the memory 209 containing the corresponding operational instructions may be embedded within the state machine or logic circuitry. The operations performed by the processor 201 and the rest of the infrastructure equipment 108 that will be described below with reference to FIGS. 3-7.

The transmitter circuitry 203 and the receiver circuitry 205 enable the infrastructure equipment 108 to communicate information bursts or packets to and acquire information bursts or packets from the mobile radios and other nodes. In this regard, the transmitter circuitry 203 and the receiver circuitry 205 include conventional circuitry to enable digital or analog transmissions over a wireless communication channel sometimes referred to as a common air interface.

The implementations of the transmitter circuitry 203 and the receiver circuitry 205 depend on the implementation of the infrastructure equipment 108 and can be implemented as part of a hardware and software architecture in accordance with known techniques. Most, if not all, of the functions of the transmitter circuitry 203 and/or the receiver circuitry 205 may be implemented in a processor or processors, such as the processor 201. However, the processor 201, the transmitter circuitry 203, and the receiver circuitry 205 have been artificially partitioned herein to facilitate a better understanding.

The receiver circuitry 205 is capable of receiving radio frequency (RF) signals from at least one and in some cases multiple bandwidths. The receiver circuitry 205 may optionally comprise a first receiver and a second receiver, or one receiver capable of receiving in two or more bandwidths. The transceiver 202 includes at least one set of transmitter circuitry 203. The transmitter circuitry 203 may be capable of transmitting to multiple devices on multiple frequency bands.

The antenna 206 comprises any known or developed structure for radiating and receiving electromagnetic energy in the frequency range containing the wireless carrier frequencies.

The buffer memory 211 may be any form of volatile memory, such as RAM, and is used for temporarily storing received information packets in accordance with the present invention.

As briefly described above, in accordance with some embodiments fade protection methods are provided that can be implemented at an infrastructure equipment (IE), such as fixed network equipment (FNE) defined in Project 25 systems.

Figure 3:
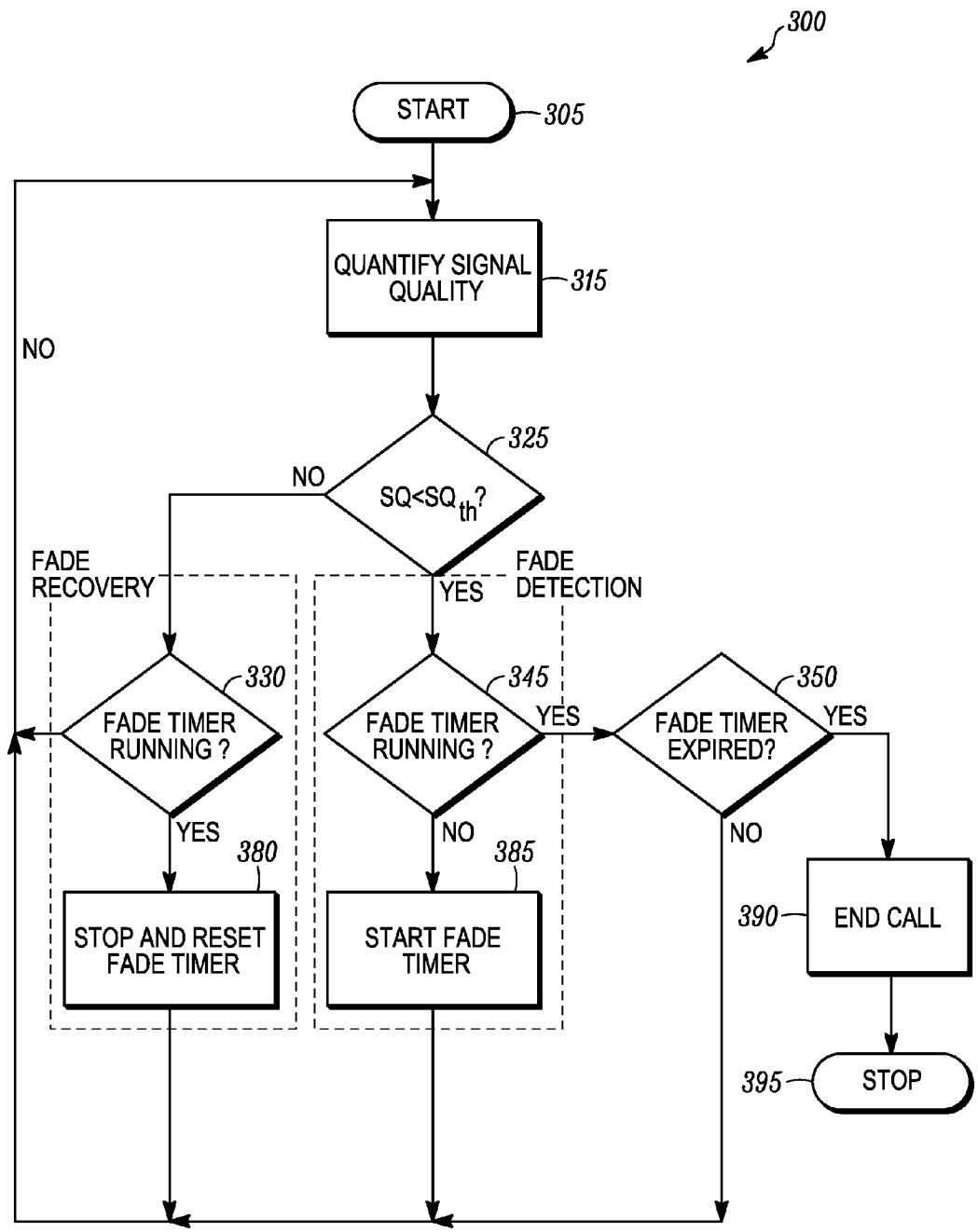
FIG. 3 is a flowchart illustrating a method for fade protection in accordance with some embodiments.

FIGS. 3 though 6 are flowcharts illustrating various fade protection methods 300-600 that can be implemented at IE in accordance with various embodiments. Methods 300-600 can be applied at the infrastructure equipment to inbound P25 Phase 2 air interface communications (mobile radio to base radio) received on the inbound traffic channel interface of the infrastructure equipment In accordance with the disclosed embodiments, an inbound signal from a mobile radio is monitored by the infrastructure equipment for indicia of poor signal quality. When certain criteria are met, a fade condition is detected. Once detected, the mobile radio is given time to recover from the fade condition, and if it does not within a certain time period, then the call is ended. If it does, the call continues. Among other things, the disclosed techniques allow for a quick determination that a call has ended.

The flow charts illustrated in FIGS. 3-6 show a number of different fade protection methods 300, 400, 500, 600. Each fade protection method 300, 400, 500, 600 includes various steps including various fade detection steps and various fade recovery steps. Even though the flow charts can be interpreted to imply some ordering in which the steps of these fade protection methods 300, 400, 500, 600 are performed, those skilled in the art will appreciate that the various steps shown can be performed in an order different than is shown and further that the various steps can take place in parallel at the IE. As such, the various steps do not necessarily have to be performed in the particular order shown in FIGS. 3-6 unless the context implies that such ordering would be necessary (e.g., a step relies on a previous step).

FIG. 3 is a flowchart illustrating a method 300 for fade protection in accordance with some embodiments.

Method 300 starts at step 305 when a signal from a mobile radio (MR) is received, and at step 315, the infrastructure equipment (IE) quantifies the quality of the received signal. As will be described below, any number of metrics can be used to quantify the quality of the signal. At step 325, the IE determines whether signal quality of the received signal over a particular duration (e.g., in the last "x" seconds) is greater than or equal to a signal quality threshold ($SQ_{th}$). When the signal quality of the received signal is greater than or equal to the signal quality threshold ($SQ_{th}$), the received signal is of "good" quality, and when the signal quality of the received signal is less than the signal quality threshold ($SQ_{th}$), the received signal is of poor quality.

Fade Detection

When the signal quality of the received signal is less than the signal quality threshold ($SQ_{th}$) (at step 325 and thus indicative of poor quality), the method 300 enters a fade detection mode and proceeds to step 345, where the IE determines whether the fade timer is running. When the IE determines that fade timer is not running this indicates that the signal quality has now transitioned from good to poor, and the method 300 proceeds to step 385, where the IE starts the fade timer. The method 300 then proceeds to step 315, where the IE continues to quantify the quality of the received signal so that the IE can continue to track the quality of the received signal from the MR to determine if the fade condition is continuing or in the MR has recovered from the fade condition.

When the IE determines that fade timer is running this indicates that the IE has previously determined that a fade condition was detected (i.e., that the quality of the received signal was previously determined to be poor), and that the quality of the received signal from the MR continues to be poor and remains consistent with a previously detected fade condition. As such, the method 300 proceeds to step 350, where the IE determines whether the fade timer has expired.

When the IE determines that the fade timer has expired (at step 350) this is indicative of a "non-recoverable" fade condition, and therefore, the method 300 proceeds to step 390, where the IE performs processing to end the call and free communication resources assigned to the MR. The method 300 then ends at step 395.

By contrast, when the IE determines that the fade timer has not yet expired (at step 350), the method 300 proceeds to step 315, where the IE continues to quantify the quality of the received signal from the MR so that the IE can determine whether the received signal is indicative of "poor" or "good" signal quality at step 325.

Fade Recovery

When the signal quality of the received signal is greater than or equal to the signal quality threshold ($SQ_{th}$) (at step 325 and thus indicative of "good" signal quality), the method 300 enters a fade recovery mode and proceeds to step 330, where the IE determines whether a fade timer is running. The fade timer measures the amount of time that a fade condition has been detected without indicia of recovery from that fade condition.

When the IE determines that fade timer is running (at step 330) this indicates that the MR has recovered from a previously detected fade condition, and the method 300 proceeds to step 380, where the IE stops the fade timer and the method 300 loops back to step 315. Throughout this description, it is to be noted that when the fade timer is stopped (e.g., is no longer running), the mobile radio has recovered from the fade condition, and the fade timer is also reset so that it will start at the beginning when it starts again.

When the IE determines that fade timer is not running (at step 330) this indicates that the signal quality remains good and that the call should continue. The method 300 then loops back to step 315, where the IE continues to quantify the quality of the received signal to determine if it is indicative of "good" quality.

Many different implementations of method 300 are possible, particularly with respect to metrics used at steps 320 and 325 to quantify signal quality and the steps performed to detect a fade condition and determine whether the MR has recovered from a fade condition. To illustrate some examples, three particular implementations of method 300 will now be described with reference to FIGS. 4-6. In these embodiments, a number of consecutive missed SACCH bursts (FIG. 4), a number of DUIDs in error (or "errored DUIDs") (FIG. 5), or a number of FEC bit errors (FIGS. 6-7) can be used as the metrics to quantify signal quality, to detect a fade condition and to determine whether a MR has recovered from a fade condition. Although each method 400, 500, 600 describes the use of certain criteria for detecting a fade condition, recovering from a fade condition, or deciding to end or continue a call, those skilled in the art will appreciate that the criteria described in these methods can be used together in a fade protection method. For instance, all of the methods 400, 500, 600 could be implemented simultaneously as part of a fade protection method.

Alternatively, in some implementations, the criteria for detecting a fade condition that are described in conjunction with method 400 can be used in conjunction with the criteria for recovering from a fade condition that that are described in conjunction with method 500 and/or in conjunction with the criteria for recovering from a fade condition that that are described in conjunction with method 600.

In other implementations, the criteria for detecting a fade condition that are described in conjunction with method 500 can be used in conjunction with the criteria for recovering from a fade condition that that are described in conjunction with method 400 and/or in conjunction with the criteria for recovering from a fade condition that that are described in conjunction with method 600.

In still other implementations, the criteria for detecting a fade condition that are described in conjunction with method 600 can be used in conjunction with the criteria for recovering from a fade condition that that are described in conjunction with method 400 and/or in conjunction with the criteria for recovering from a fade condition that that are described in conjunction with method 500.

In still other implementations, the criteria for detecting a fade condition that are described in conjunction with methods 400, 500 or 600 can be used in conjunction with other criteria for recovering from a fade condition that that are not described in conjunction with any one of methods 400, 500 or 600. Likewise, the criteria for recovering from a fade condition that that are described in conjunction with methods 400, 500 or 600 can be used in conjunction with the criteria for detecting a fade condition that that are not described in conjunction with any one of methods 400, 500, or 600.

In short, any combination of the methods 400, 500, 600 is contemplated to be within the scope of the present invention.

Figure 4:
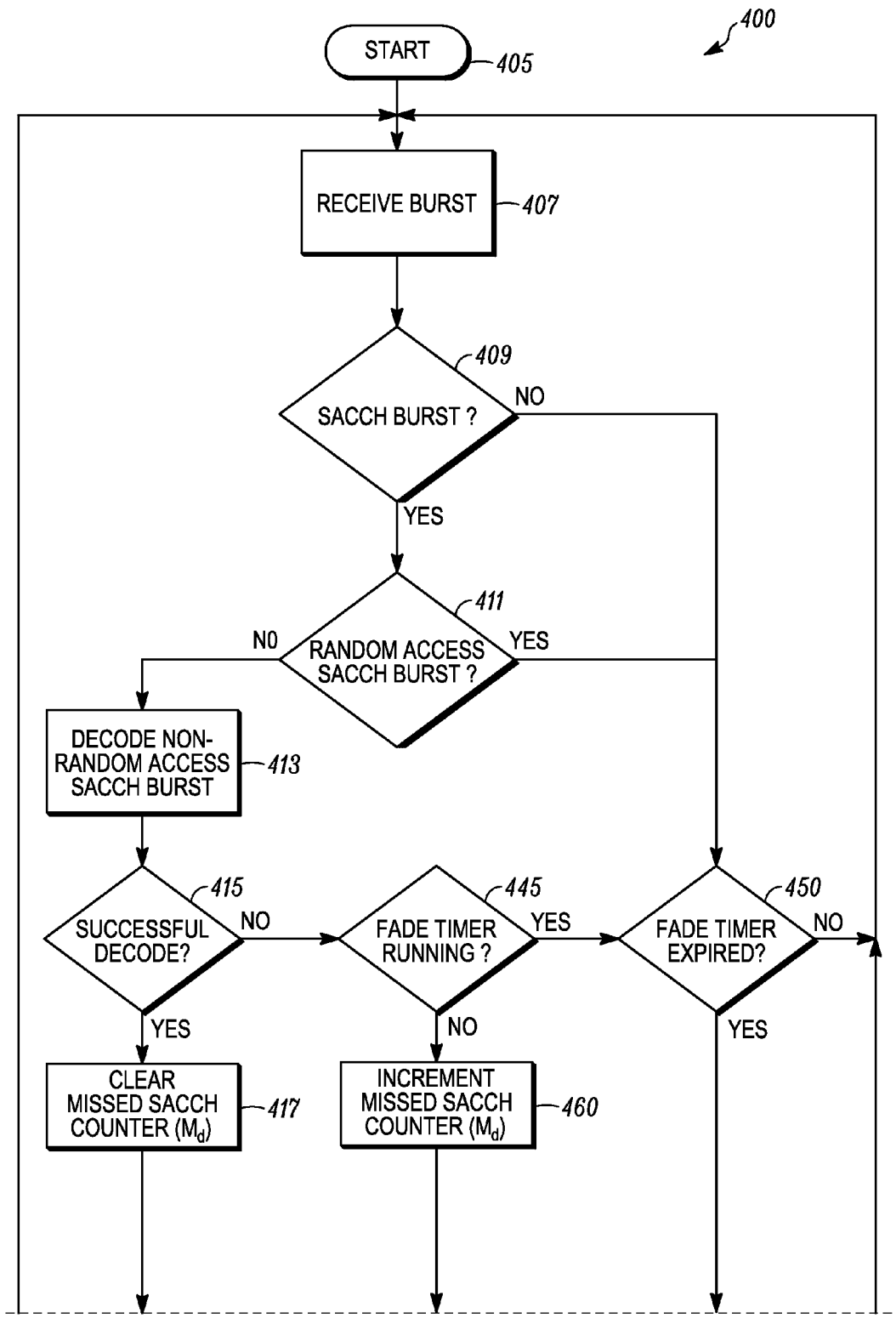
FIG. 4 is a flowchart illustrating a method for fade protection in accordance with some embodiments.
Figure 4:
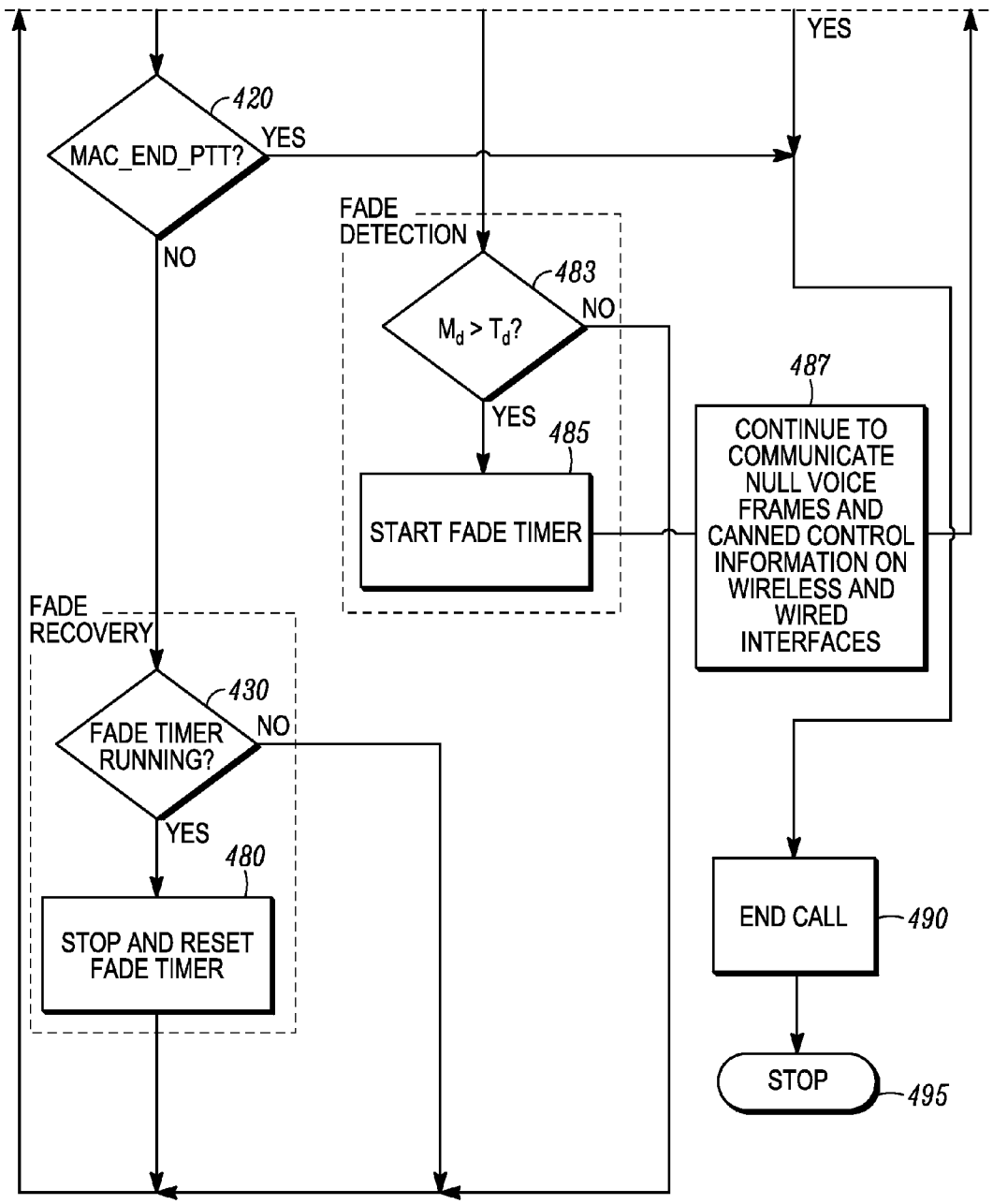

FIG. 4 is a flowchart illustrating a method 400 for fade protection in accordance with some embodiments.

Method 400 starts at step 405, and at step 407 a burst is received from a mobile radio (MR). As used herein, the term "burst" refers to a unit of transmission of a continuous succession of modulated bits that lasts for a timeslot. A burst corresponds to the physical contents of a timeslot. Types of burst can include voice bursts and IEMI bursts that include signaling information. Types of IEMI bursts include FACCH bursts and SACCH bursts.

At step 409, the infrastructure equipment (IE) determines whether the burst is a SACCH burst. As described above, the SACCH is a periodic signaling slot occurring once per superframe for each channel (using inverted signaling for two-slot). These slots are not assigned to voice in the VCH. A SACCH burst is sent once every superframe and thus occurs once every 360 ms. In addition, one out of every 4 SACCH bursts is a random access SACCH burst that may or may not be transmitted. Although the DUID indicates the burst type, the IE can also infer the burst type from the channel framing. The superframe pattern lets the IE know that the SACCH bursts are in slots 10 and 11, so slots 10 and 11 can be treated as SACCH bursts. Similarly, the ultraframe pattern lets the IE know when the random access SACCH bursts are.

When the IE determines that the burst is a SACCH burst, the method 400 proceeds to step 411, where the IE determines whether the SACCH burst is a Random Access SACCH (RA-SACCH) burst.

When the IE determines that the burst is not a RA-SACCH burst (at step 411), the method 400 proceeds to step 413, where the IE decodes the non-random access SACCH burst.

In one embodiment, the IE decodes the Reed-Solomon FEC. In some embodiments, the IE also checks the CRC, then evaluates the payload. Evaluation of the payload can involve verifying that the payload includes an opcode that indicates MAC_ACTIVE, and verifying that the received offset in the non-random access SACCH burst is in agreement with the expected offset, which is either set at the beginning of the speech phase (described above) either through a MAC_PTT burst in normal entry or a MAC_ACTIVE in late-entry. For example, if a MAC_PTT burst is received to indicate the setup phase of a call, it also indicates where the 4V burst, or alternately where the 2V burst, is located. When a SACCH burst is received during the speech phase, it is determined whether the position of the 4V/2V has been altered within the superframe. If so, the current speech phase ends and a new call starts. Similarly, the setup phase can also start with a SACCH. This will also indicate where the 4V or 2V is located. Once in the speech phase, it can be determined whether the offset in the speech phase SACCH is not different from the offset received during the setup phase.

The method 400 then proceeds to step 415, where the IE determines whether decoding of the non-random access SACCH burst was successful.

Fade Detection

When the IE determines that the decoding of the non-random access SACCH burst was not successful at step 415 (e.g., when Reed-Solomon decoding of the FEC was not successful), the method 400 proceeds to step 445, where the IE determines whether the fade timer is running.

When the IE determines that the fade timer is not running, the method 400 proceeds to step 460, where the IE increments the missed SACCH counter, and then fade detection is performed at steps 483 and 485. In one embodiment, the missed SACCH counter stores the number ($M_d$) of consecutive non-random access SACCH bursts that were not successfully decoded (at step 415). This way, the IE can detect fade when more than $T_d$ consecutive SACCH failures are detected. More specifically, at step 483, the IE determines whether a current value ($M_d$) of the missed SACCH counter is greater than a detection threshold ($T_d$). When the IE determines that the current value ($M_d$) of the missed SACCH counter is less than or equal to a fade detection threshold ($T_d$), this indicates that a fade condition has not yet been detected, and the method 400 loops back to step 407, where the IE receives another burst from the MR. In other words, because the number of missed SACCHs is below the detection threshold ($T_d$), this indicates that the number of missed SACCHs is insufficient to indicate a fade condition. The values of $M_d$ and $T_d$ can be chosen to balance the speed to detect a fade condition with the reliability of detecting a fade condition.

When the IE determines that the current value ($M_d$) of the missed SACCH counter is greater than a detection threshold ($T_d$), then a fade condition is detected, and the method 400 proceeds to step 485, where the IE starts the fade timer to being timing the duration of the fade condition, and the method 400 loops back to step 407, where the IE receives another burst from the MR.

In one implementation, when the IE detects the fade condition, the IE also transmits null voice frames on the common air interface and/or on the wired interface at step 487. For example, in one particular implementation of step 487, the null voice frames and signaling information can be sent during the suspended phase instead of sending FACCH bursts.

Continuation of Voice Framing During Fade Condition

In some two-way radio systems, when a fade condition is detected, the IE stops transmitting voice frames thereby ending the speech phase. With this approach, up to one second of voice information can be missed while the call is restarting. This results in extra lost audio when recovering from the fade condition.

In accordance with some of the disclosed embodiments, optional step 487 can be performed to allow voice framing to continue when a fade condition is detected, instead of simply ending the speech phase, thereby reducing lost audio upon fade recovery. For example, in some of the disclosed embodiments, at step 487, the IE transmits null voice frames on the common air interface, and/or on the wired interface. Null voice frames can be, for example, "silence frames" (as defined by the vocoder), or any other type of indication to the end units that the audio frame needs to be muted. This allows the receiving MRs (and other network nodes) to maintain voice framing after the fade condition is detected so that lost audio is reduced in the event the transmitting MR recovers from the fade condition. The mobile radio "flywheels" the null voice frames until the call recovers, and the audio can resume almost immediately. For example, instead of ending the speech phase when a fade condition is detected, the IE continues to send canned null voice frames and canned control information (ESS marked as erasure or failed SACCH) so that the MR maintains the voice framing and does not synchronize inadvertently to a new encryption sequence. The canned control information is sent to ensure that the receiving nodes do not inadvertently change contexts or transmit garbled audio to the speaker. The receiving MR mitigates the audio interruption by muting the loudspeaker output, but still tracks the progression of the voice frames so it does not have to re-synchronize when the speech returns. In addition, for encrypted audio, the receiving MR also keeps the context information for the encrypted call (e.g., the decryption algorithm, key and/or the pseudo-random pattern (sometimes called Message Indicator (MI)) that it needs to apply. Upon fade recovery, the lost flag is cleared and the MR can immediately start playing audio information.

Fade Recovery

When the IE determines that the decoding of the non-random access SACCH burst was successful at step 415 (e.g., when Reed-Solomon decoding of the FEC was successful), the method 400 proceeds to step 417, where the IE clears its missed SACCH counter ($M_d$). The method 400 then proceeds to step 420, where the IE determines whether the non-random access SACCH burst is an end-of-call indicator (MAC_END_PTT PDU). The IE may decide to end a call, for example, when the IE receives an end-of-call indicator (MAC_END_PTT) from the MR. The MR sends an end-of-call indicator (MAC_END_PTT) when the MR user releases the PTT button; it is the last message sent before the MR dekeys. Any activity on the channel by a MR when the channel has not been assigned to it by the IE is considered illegal activity and is blocked. The end-of-call indicator (MAC_END_PPT PDU) check (step 420) is performed to decide whether or not to enter the fade recovery steps 430, 480.

When the IE determines that the non-random access SACCH burst is not an end-of-call indicator (MAC_END_PTT PDU) at step 420, then fade recovery begins at step 430, where the IE determines whether the fade timer is running.

When the IE determines that the fade timer is running, the method 400 proceeds to step 480, where the IE stops and resets the fade timer. The method 400 then loops back to step 407, where the IE receives another burst from the MR. When the IE determines that the fade timer is not running, the method 400 loops back to step 407, where the IE receives another burst from the MR. The missed SACCH counter ($M_d$) counts a number of consecutive missed SACCH bursts (e.g., that are not received or unable to be decoded at step 413).

Fade Timer

The fade timer measures the duration that a fade condition has been detected without recovery. The fade timer starts when a fade condition is detected (e.g., when a number of consecutive missed SACCH bursts exceeds a fade detection threshold ($T_d$) at step 483) and stops when the fade condition is no longer occurring. When the fade timer expires, this indicates that the fade condition is "permanent" and that the call should end. In other words, if the length of a fade condition persists for a time longer than the duration of the fade timer, then the call is terminated.

As used herein, the term "fade timer" can be interpreted as being either (1) a fade timer that measures particular time duration, or (2) a fade counter that counts the absence of regularly occurring events that are indicative of a continuing fade condition up to a certain number and then stops. In some implementations, the absence of the number of regularly occurring events corresponds to a particular time duration, and therefore when the fade counter counts the absence of these regularly occurring events that are indicative of a continuing fade condition, and this continuing absence of these regularly occurring events corresponds to a particular time duration that is the basis for a decision to end the call.

For example, in one embodiment, the fade timer can measure a particular time duration and if the fade timer reaches that particular time duration it stops or expires, and in one implementation the duration can be set to a default value of approximately 1.2 seconds. In some embodiments, the duration of the fade timer is programmable.

Equivalently, in an alternative embodiment, a fade counter can count the number of consecutive times that a SAACH is missed (which is one example of the absence of a regularly occurring event that corresponds to a particular time duration). If the fade counter reaches a particular count, the IE will end the call. For instance, in one implementation, a fade condition can be detected when three consecutive SACCH messages are missed, the IE enters a suspended phase, and starts a fade counter that will count three additional, consecutive missed SACCH messages. When the count is equal to three, the IE will end the call since it has missed six consecutive SACCH messages. Thus, although this implementation does not directly use a timer to decide when to end the call, it counts a metric that is indicative of the continued presence of a fade condition to decide when to tear down the call, and this count corresponds to a particular time duration.

When the infrastructure equipment (IE) determines that the burst is not a SACCH burst (at step 409), the method 400 proceeds to step 450, where the IE determines whether a fade timer has expired. Likewise, when the IE determines that the burst is a RA-SACCH burst at step 411, the method 400 proceeds to step 450, where the IE determines whether a fade timer has expired. Similarly, when the IE determines that the fade timer is running (at step 445), the method 400 proceeds to step 450, where the IE determines whether the fade timer has expired. When the IE determines that the fade timer has not yet expired (at step 450), the method 400 proceeds loops back to step 407, where the IE receives another burst from the MR.

End of Call

When the IE determines that the non-random access SACCH burst includes an end-of-call indicator (MAC_END_ PPT PDU) at step 420 or that the fade timer has expired at step 450, the method 400 proceeds to step 490, where the IE performs processing necessary to end the call. For example, in one implementation the IE performs processing to "tear down" the call and free communication resources dedicated to that call. When the IE decides to end a call, the IE changes from a call-in-progress state to a hangtime state and MAC hangtime messages are sent on the outbound voice channel (VCH). The hangtime state is used to provide call continuity. In the hangtime state the channel is reserved for a short period of time (e.g., on the order of 1-2 seconds) referred to as "hangtime" so that other members of the group can request to talk and be assigned to the same channel. This way, a conversation among members of a group can maintain a flow without worrying about another group taking over the channel. Once hangtime has ended, the channel resources are released and made available for other call requests.

Figure 5:
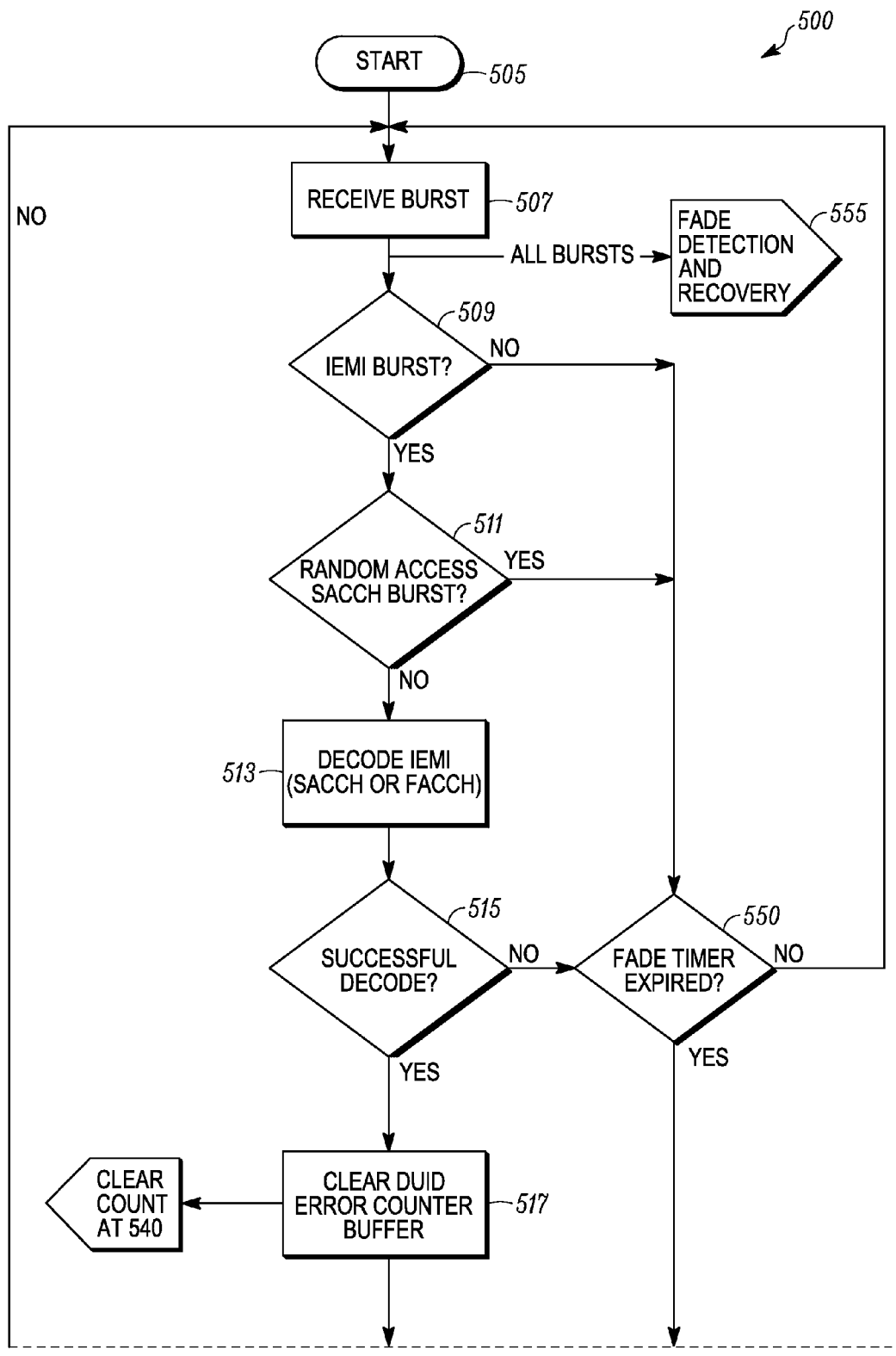
FIG. 5 is a flowchart illustrating a method for fade protection in accordance with some embodiments.
Figure 5:
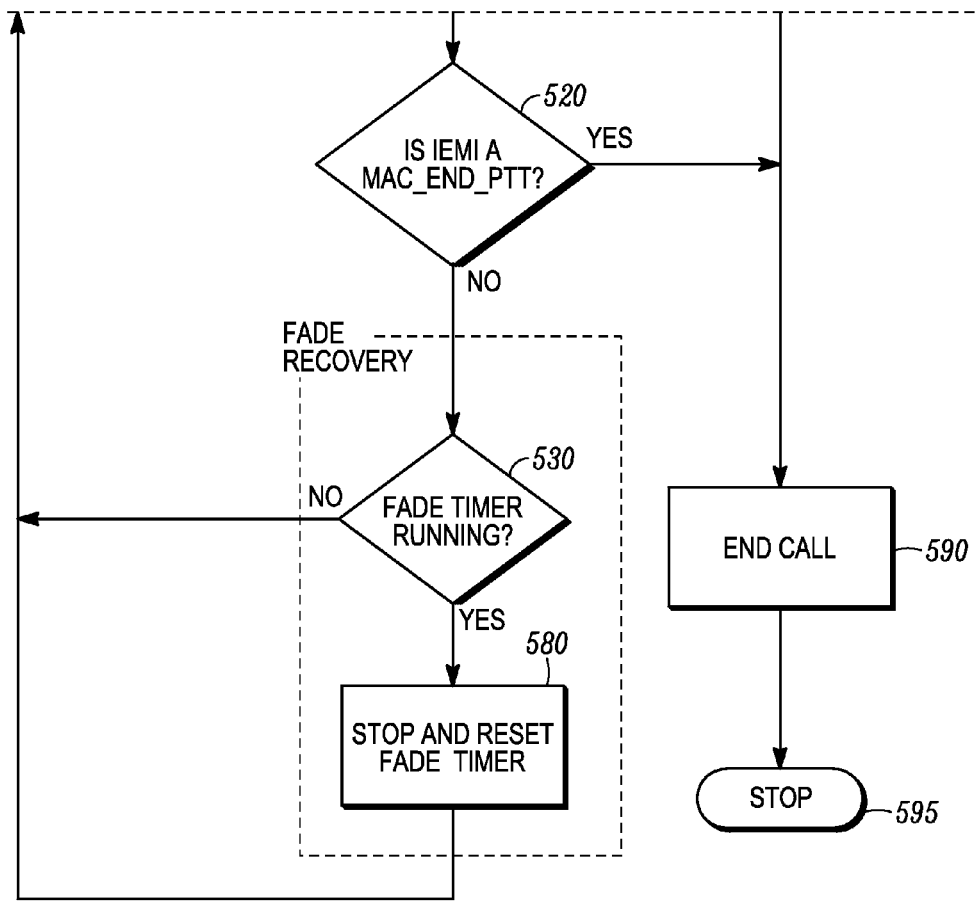
Figure 5:
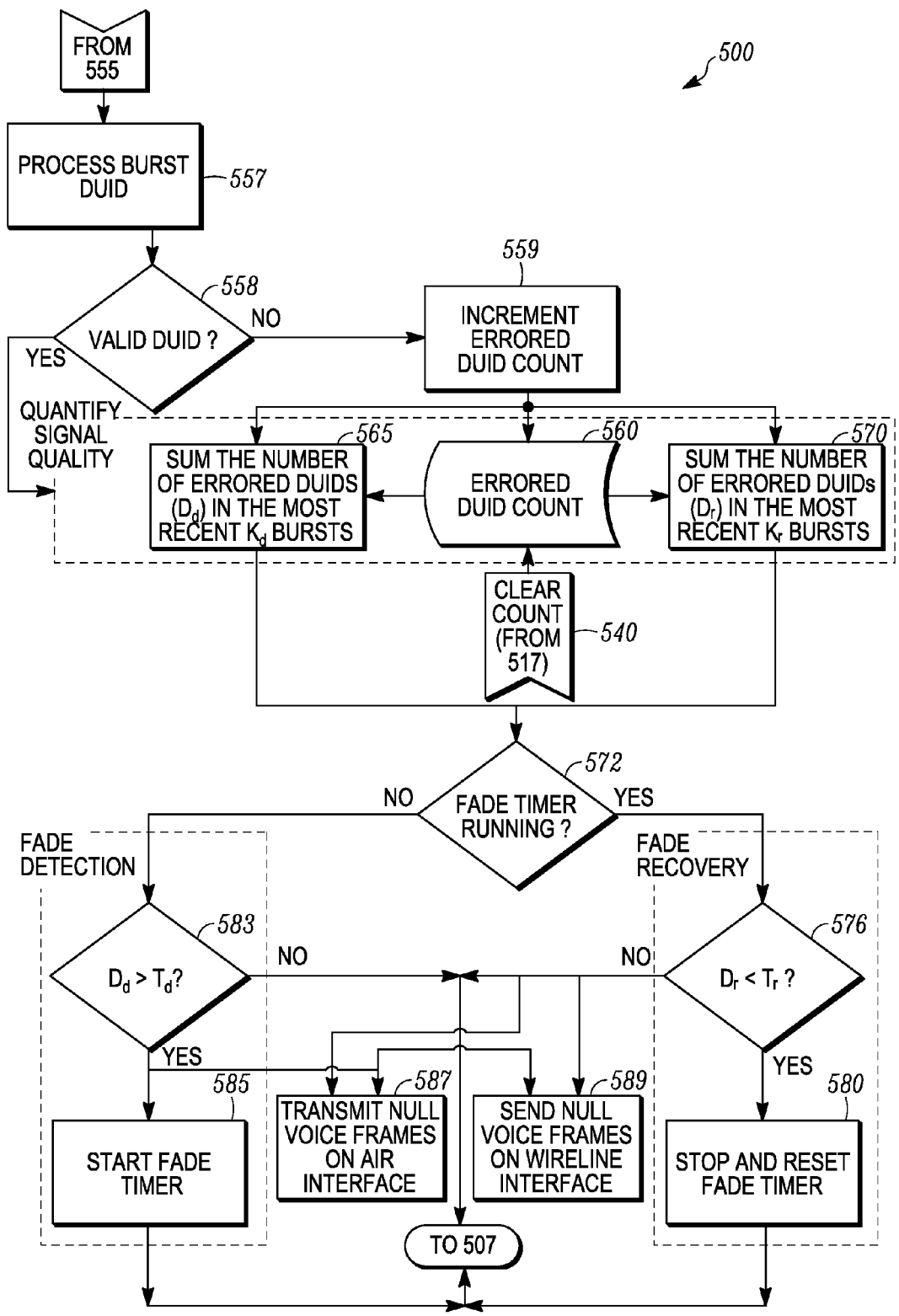

FIG. 5 is a flowchart illustrating a method 500 for fade protection in accordance with some embodiments.

Method 500 starts at step 505, and at step 507 a burst is received from a mobile radio (MR). As will be described below, each burst is processed at step 509 to determine whether it is an IEMI burst. In addition, each burst is sent to a fade detection and recovery path for processing at step 555 as will now be described below.

Fade Detection and Recovery

Each burst includes a DUID. Therefore, when the burst is received at step 507, it is sent to fade detection and fade recovery processing (step 555), which begins at step 557, where the DUID of that burst is processed. At step 557, the IE processes the DUID to determine whether it is valid or in error. This processing can include performing at least one check. Examples of checks that can be performed include one or more of: checking the number of errors in the DUID against an expected DUID, FEC decoding the DUID and comparing it to an expected DUID, comparing the received 8-bit encoded DUID to the expected 8-bit encoded DUID and allowing for up to "M" errors before declaring the DUID to be in error, or other equivalent checks that would reflect errors in the DUID. At step 558, the IE determines whether the DUID is valid or in error. A DUID is determined to be valid at 558 if it passes the check(s) performed during processing at step 557. A DUID is determined to be in error at step 558 if it fails any check(s) performed during processing at step 557. A DUID that is determined to be in error is referred to herein as an "errored" DUID. For example, in one implementation, the DUID is invalid or errored when more than one error is detected in the received DUID during decoding. However, another number of errors could be used in other embodiments. In any embodiment, the number of errors in the DUID determines the trade-off between time and reliability.

If the DUID is determined to be valid, the method 500 proceeds directly to steps 560, 565, 570, as will be described below.

If the DUID is determined to be in error (or invalid), the method 500 proceeds to step 559, where the DUID error counter buffer (DECB) is incremented, and the errored DUID count maintained at block 560 is used at steps 565 and 575. At step 565, the number of errored DUIDs ($D_d$) in the most recent $K_d$ bursts is summed. At step 570, the number of errored DUIDs ($D_r$) in the most recent $K_r$ bursts is summed. The summed number of errored DUIDs ($D_r$) is utilized in fade recovery (during step 576), whereas the summed number of errored DUIDs ($D_d$) are utilized in fade detection (during step 583). To determine whether to perform fade detection processing (583/585) or fade recover processing (steps 576/580), the IE determines whether a fade timer is running at step 572.

Fade Detection

When the IE determines that the fade timer is not running, the method 500 enters a fade detection mode and proceeds to step 583, where the IE determines whether a current value of the summed number ($D_d$) of errored DUIDs (in the most recent $K_d$ bursts) is greater than a fade detection threshold ($T_d$).

In other words, during fade detection, the summed number ($D_d$) of errored DUIDs in the most recent $K_d$ bursts are compared to a fade detection threshold ($T_d$) to determine whether the MR is presently experiencing a fade condition. To determine whether a fade condition has happened the DUID error counter buffer (DECB) counts the number of DUIDs that are determined to be in error ("errored DUIDs") over a specific time window. This time window has a length that is defined by a number of bursts ($K_d$). The choice of $K_d$, $T_d$ and $D_d$ allows performance to be tuned to specific network conditions.

As mentioned above, the DUID error counter buffer (DECB) is cleared (at step 540) if a valid SACCH or FACCH burst is decoded because that indicates that valid activity is still present on the channel and the call needs to be maintained.

When the IE determines (at step 583) that the current value of the summed number ($D_d$) of errored DUIDs (in the most recent $K_d$ bursts) is less than or equal to the fade detection threshold ($T_d$), this indicates that a fade condition has not yet been detected, and the method 500 loops back to step 507, where the IE receives another burst from the MR. In other words, because the number of errored DUIDs is below the fade detection threshold ($T_d$) the number of DUIDs in error is insufficient to indicate that a fade condition has been detected.

When the IE determines (at step 583) that the current value of the summed number ($D_d$) of errored DUIDs (in the most recent $K_d$ bursts) is greater than the fade detection threshold ($T_d$), then a fade condition is detected, and the method 500 proceeds to step 585, where the IE starts the fade timer to being timing the duration of the fade condition. The method 500 then loops back to step 507, where the IE receives another burst from the MR.

In accordance with some of the disclosed embodiments, optional steps 587 and 589 can be performed, when the IE detects the fade condition. In these embodiments, the IE also transmits null voice frames and canned signaling information on the common air interface at step 587 and/or on the wired interface at step 589. As described above with reference to FIG. 4, this allows voice framing to continue when a fade condition is detected, instead of simply ending the speech phase, thereby reducing lost audio upon fade recovery.

Fade Recovery

When the IE determines that the fade timer is running (at step 572), the method 500 enters a fade recovery mode and proceeds to step 576, where the IE determines whether the number ($D_r$) of errored DUIDs (in the most recent $K_r$ bursts) is less than a fade recovery threshold ($T_r$). In other words, during fade recovery mode, the summed number ($D_r$) of errored DUIDs in the most recent $K_r$ bursts are compared to a fade recovery threshold ($T_r$) to determine whether the MR has recovered from a previously detected fade condition. The number ($K_r$) of bursts defines a fade recovery window. The burst length ($K_r$) of this fade recovery window can be pre-configured or user-configurable such that the fade recovery window is a sliding fade recovery window. The choice of $K_r$, $T_r$ and $D_r$ allows performance to be set for specific network conditions. The ability to select values for $K_d$, $T_d$, $D_d$, $K_r$, $T_r$ and $D_r$ allows for the difference between the criteria for fade detection and the criteria for fade recovery to be adjusted, which allows for a certain amount of hysteresis to be provided so that the fade timer is not constantly stopping and starting in marginal conditions. The hysteresis comes from the fact that $K_d$ is different than $K_r$, $T_d$ is different than $T_r$, and $D_d$ is different than $D_r$.

When the IE determines (at step 576) that the current value of the summed number ($D_r$) of errored DUIDs (in the most recent $K_r$ bursts) is less than or equal to the fade recovery threshold ($T_r$), this indicates that the MR has recovered from the fade condition, and the method 500 proceeds to step 580, where the IE stops and resets the fade timer to indicate that the fade condition has ended. The method 500 then loops back to step 507, where the IE receives another burst from the MR. For instance, if fade recovery threshold ($T_r$) is nine and length ($K_r$) of the fade recovery window is twelve, the fade recovery rules can be set such that the fade timer is stopped when eight (or fewer) of the twelve most recent DUIDs are in error.

When the IE determines (at step 576) that the current value of the summed number ($D_r$) of errored DUIDs (in the most recent $K_r$ bursts) is greater than or equal to the fade recovery threshold ($T_r$), this indicates that the MR has not recovered from the fade condition, and the method 500 loops back to step 507, where the IE receives another burst from the MR. Optionally, steps 587 and 589, described above, can also be performed in some embodiments prior to looping back to step 507.

IEMI Bursts Versus Non-IEMI Bursts

Upon receiving bursts, the IE performs processing at step 509, the IE determines whether the burst is an Inbound Encoded MAC Information (IEMI) burst. As noted above, an IEMI can be either a random or non-random SACCH burst or a FACCH burst. When an IEMI burst is sent in any one of slots 0-9, it is a FACCH burst and SACCH bursts are sent in slots 10-11.

Processing when a Burst is not an IEMI Burst

When the IE determines that the burst is not an IEMI burst, the method 500 proceeds to step 550, where the IE determines whether a fade timer has expired. As above, the fade timer measures the duration that a fade condition has been detected. The fade timer starts when a fade condition is detected, which in this embodiment is when more than $T_d$ DUIDs in the previous $K_d$ bursts are determined to be in error. The fade timer stops when the fade condition is no longer occurring.

When the fade timer expires (e.g., exceeds a threshold fade time), this indicates that the fade conditions is "permanent" and that the call should end even though an explicit notification has not been received from the MR. As such, when the IE determines that the fade timer has expired at step 550, the method 500 proceeds to step 590, where the IE performs processing necessary to end the call. When the IE determines that the fade timer has not yet expired, the method 500 loops back to step 507, where the IE receives another burst from the MR.

Processing when a Burst is an IEMI Burst

When the IE determines that the burst is an IEMI burst, the method 500 proceeds to step 511, where the IE determines whether the IEMI burst is a Random Access SACCH (RA-SACCH) burst.

When the IE determines that the IEMI burst is a RA-SACCH burst, the method 500 proceeds to step 550, where the IE determines whether a fade timer has expired, and processing continues as described above.

When the IE determines that the IEMI burst is not a RA-SACCH burst, the method 500 proceeds to step 513, where the IE decodes the IEMI burst, which is either a non-RA-SACCH burst or a FACCH burst. In one embodiment, the IE performs similar decoding steps to those describe above with reference to step 413 of FIG. 4. The method 500 then proceeds to step 515, where the IE determines whether decoding of the IEMI burst was successful. When the IE determines that decoding of the IEMI burst was successful, the method 500 proceeds to step 517, where the IE clears a DUID error counter buffer (DECB). The DECB counts a number of missed DUIDs that were determined to be in error in the last $K_d$ bursts. The method 500 then proceeds to step 520 (described below) and to step 560 where the errored DUID count is cleared and processing continues at steps 565, 570 as described above.

When the IE determines that the decoding of the IEMI burst was not successful, the method 500 proceeds to step 550, where the IE determines whether the fade timer has expired, and processing continues as described above.

When the IE determines that the decoding of the IEMI burst was successful at step 515, after clearing the DECB at step 517, the method 500 proceeds to step 520, where the IE determines whether the IEMI burst is an end-of-call indicator (MAC_END_PPT PDU).

When the IE determines that the IEMI burst is an end-of-call indicator (MAC_END_PTT PDU), the method 500 proceeds to step 590, where the IE performs processing necessary to end the call, as described above. When the IE determines that the IEMI burst is not an end-of-call indicator (MAC_END_PTT PDU), then there has been no specific indication from the MR that the call has ended. If the IEMI burst is determined to be valid (at step 515), and it is determined that the SACCH burst is not an end-of-call indicator (MAC_END_PTT) at step 520, then a check is performed at step 530 to determine whether the fade timer is already running since this indicates that a fade condition was detected previously (e.g., when more than $T_d$ DUIDs in the previous $K_d$ bursts are determined to be in error).

When the IE determines that the fade timer is running (at step 530) this indicates that a fade condition was detected previously, and the method 500 proceeds to step 580, where the IE stops the fade timer. The method 500 then loops back to step 507, where the IE receives another burst from the MR.

When the IE determines that the fade timer is not running (at step 530), the method 500 loops back to step 507, as described above.

Figure 6:
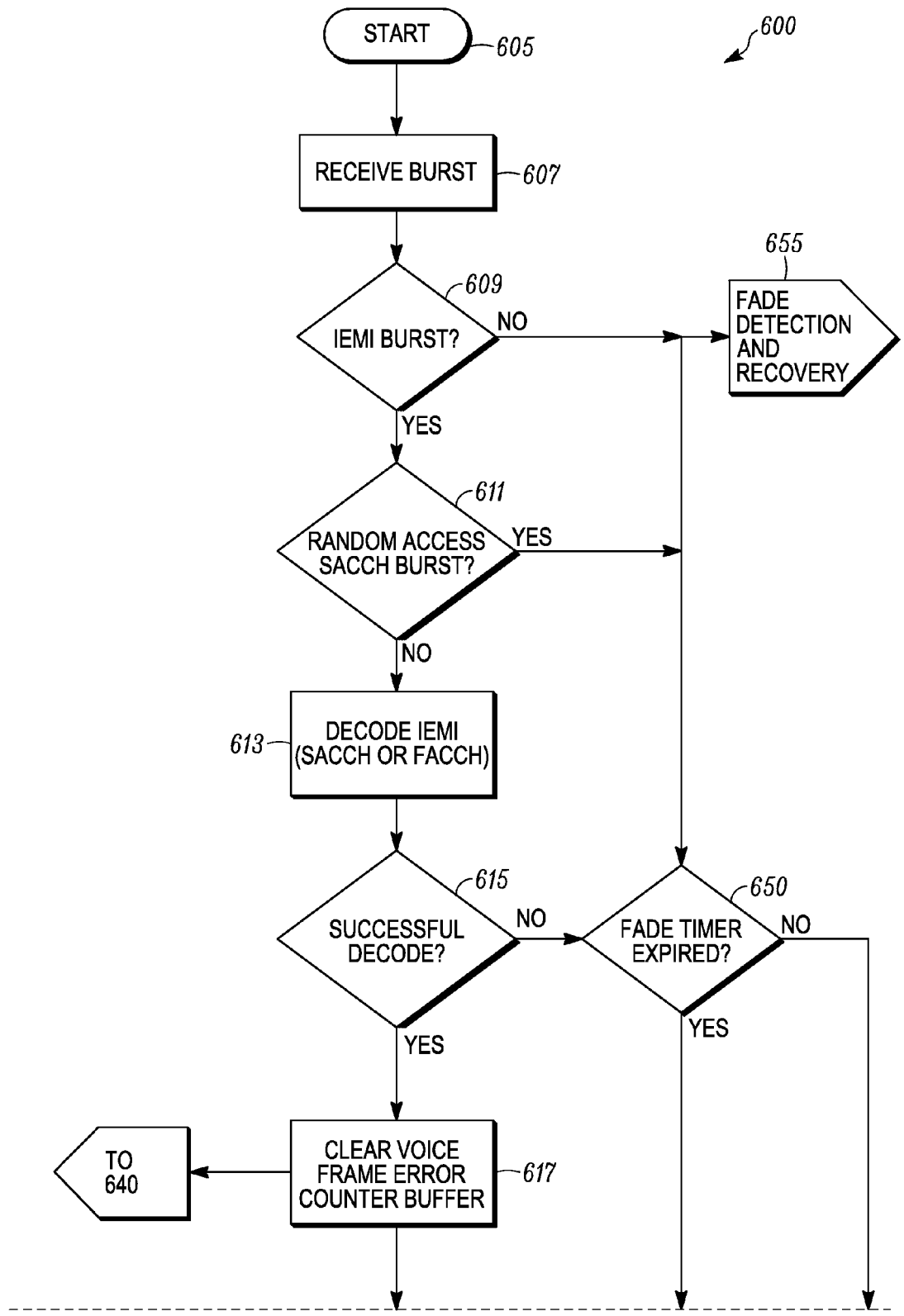
FIG. 6 is a flowchart illustrating a method for fade protection in accordance with some embodiments.
Figure 6:
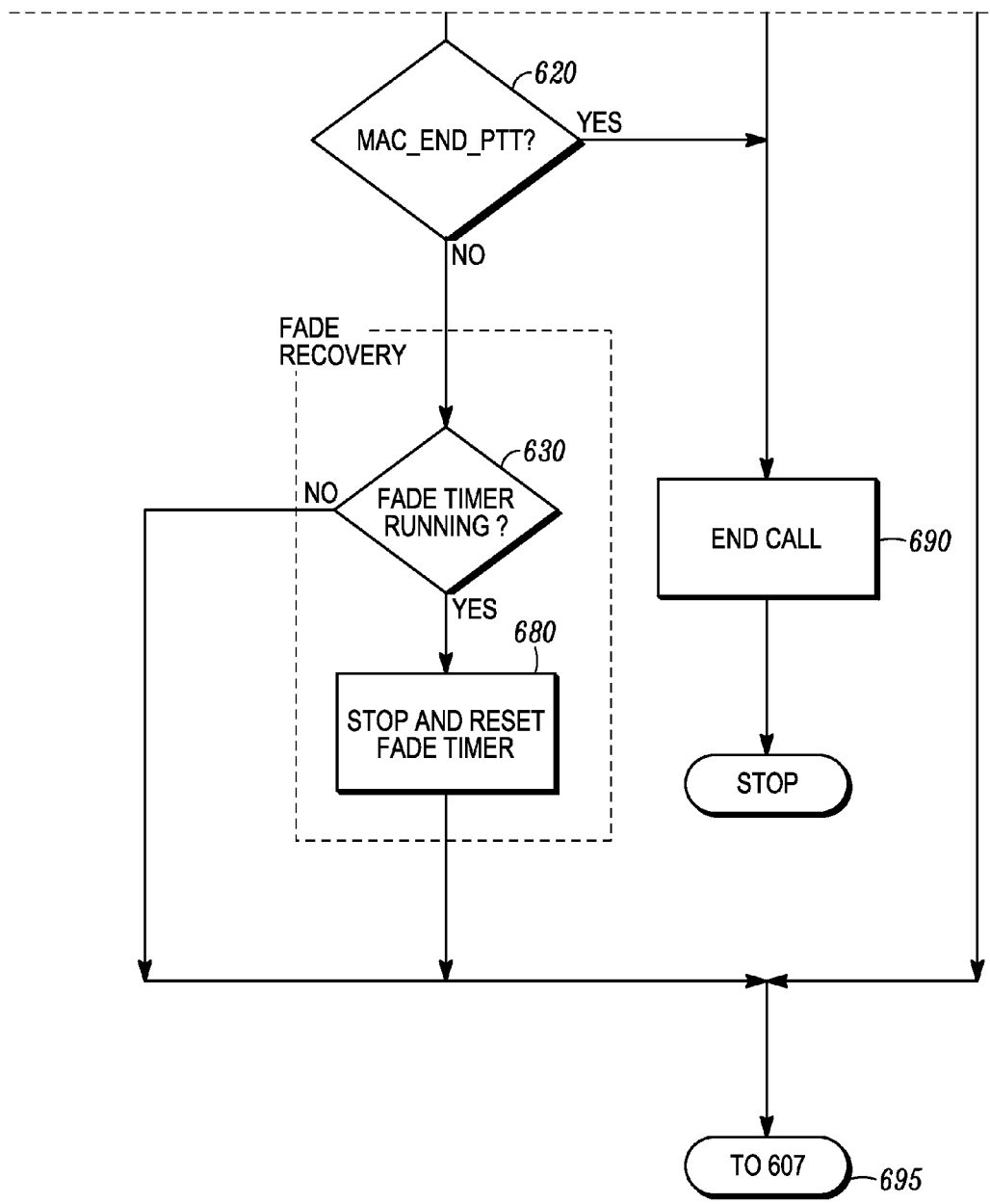
Figure 6:
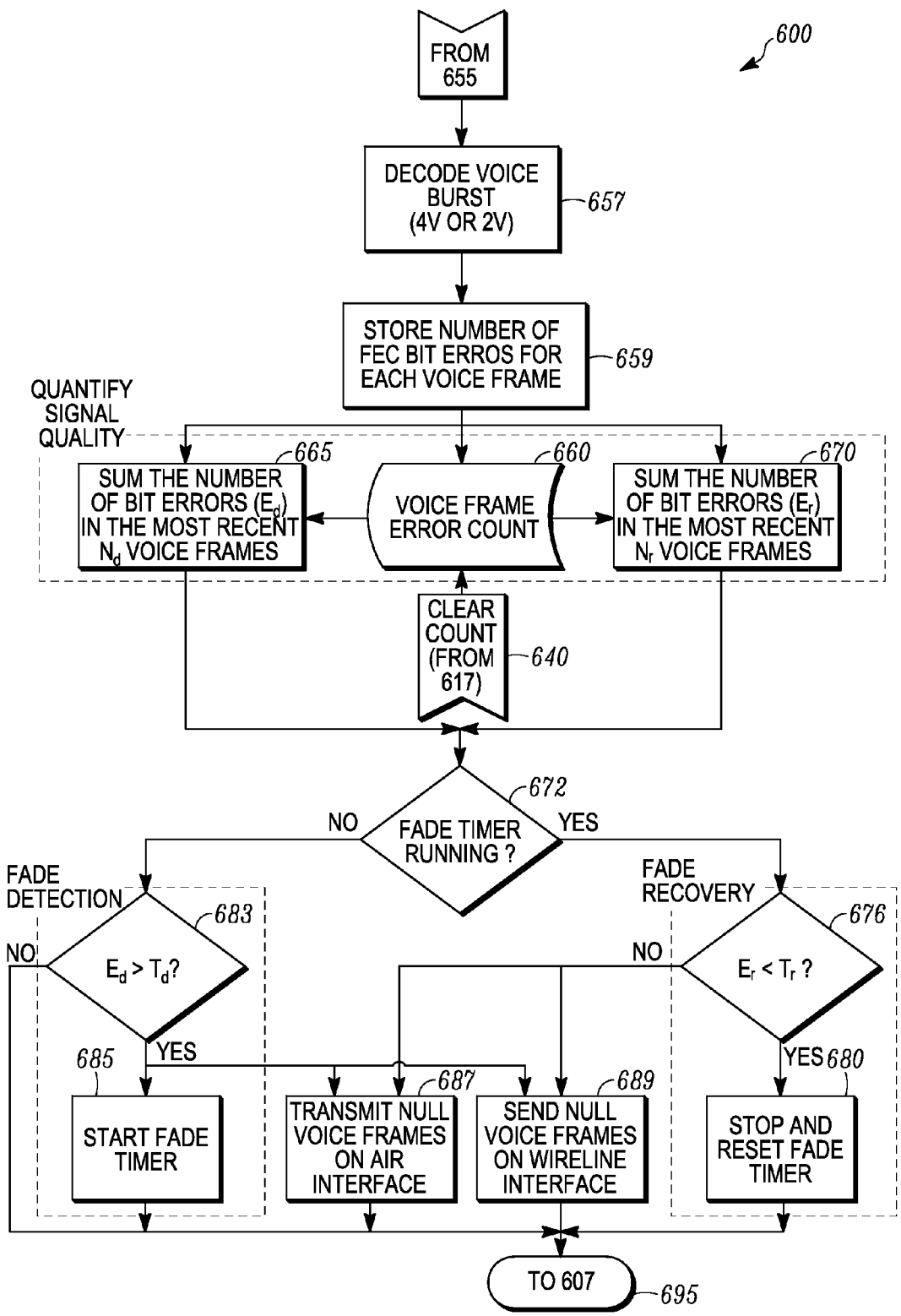

FIG. 6 is a flowchart illustrating a method 600 for fade protection in accordance with some embodiments.

Method 600 starts at step 605, and at step 607 a burst is received from a mobile radio (MR). At step 609, the infrastructure equipment (IE) determines whether the burst is an IEMI burst. As described above, the IEMI burst includes signaling information, whereas voice bursts contain voice information and encryption information.

Processing when Burst is a Voice Burst

When the IE determines that the burst is not an IEMI burst (and hence is a voice burst), the method 600 proceeds to step 650, where the IE determines whether a fade timer has expired.

The fade timer measures the duration that a fade condition has been detected. The IE starts a fade timer (or allows it to continue to run) whenever a fade condition is detected, and stops the fade timer when it determines that the fade condition is no longer occurring (e.g., when the MR recovers from the fade condition).

When the IE determines that the fade timer has expired (e.g., exceeds a threshold fade time) at step 650, this indicates that the fade condition is "permanent" and that the call should end even though an explicit notification has not been received from the MR. As such, if there is no fade recovery before the fade timer expires, the method 600 proceeds to step 690, where the IE performs processing necessary to end the call and the call is terminated. When the IE determines that the fade timer has not yet expired, the method 600 loops back to step 607, where the IE receives another burst from the MR.

In addition, as indicated at step 655, the voice bursts (i.e., non-IEMI bursts) are sent for fade detection and recovery processing at step 655. In other words, in method 600 fade protection is performed only with respect to voice bursts that are received. In one embodiment, a voice burst can be either a 2V burst or a 4V burst as described above.

Fade Detection and Recovery

Each time a voice burst is received, fade detection and recovery processing begins (step 655).

At step 657, the voice burst is decoded, and each voice frame is FEC decoded per the Advanced Multi-Band Excitation (AMBE) half-rate FEC protocol. When the voice frame is decoded at step 657, several decoding steps are performed that may include (in no particular order): (1) de-interleaving, (2) FEC decoding, (3) storing the number of errors corrected by the decoder including erasure information, (4) de-scrambling, and (5) storing the number of errors corrected by the decoder. These steps are repeated either 2 or 4 times depending on the type of voice burst (2V or 4V).

At step 659, the IE monitors the bit errors detected in each voice frame, and stores the number of bit errors that are detected in each voice frame. For example, in one implementation, the IE detects the FEC bit errors in each voice frame (or a portion of each voice frame), and stores the number of FEC bit errors that are detected for each voice frame. A voice frame error counter buffer (represented by block 660) is used to store data regarding the number of bit errors in each voice frame as well as information regarding whether the IEMI for that voice frame was valid. The information maintained at block 660 is used at steps 665 and 670.

At step 665, the sum of the number ($E_d$) of bit errors in the most recent $N_d$ voice frames is determined. At step 670, the sum of the number ($E_r$) of bit errors in the most recent $N_r$ voice frames is determined. As will be described below, the summed number ($E_r$) of bit errors (in the most recent $N_r$ voice frames) is utilized in fade recovery (at step 676), whereas the summed number ($E_d$) of bit errors (in the most recent $N_d$ voice frames) is utilized in fade detection (at step 683). In other words, different criteria are used for fade detection and fade recovery. To determine whether to perform fade detection processing (683/685) or fade recovery processing (steps 676/680), the IE determines whether a fade timer is running at step 672.

Fade Detection

When the IE determines that the fade timer is not running, the method 600 enters a fade detection mode and proceeds to step 683, where the IE determines whether a current value of the summed number ($E_d$) of bit errors (in the most recent $N_d$ voice frames) is greater than a fade detection threshold ($T_d$). The number of bit errors ($E_d$), the number of voice frames ($N_d$) and the fade detection threshold ($T_d$) can be varied depending on the implementation and are chosen to balance the need for quick detection of fade conditions with the need to maintain a call without interruption in fringe coverage areas.

When the IE determines that the current value of the summed number ($E_d$) of bit errors is less than or equal to the fade detection threshold ($T_d$), this indicates that a fade condition has not yet been detected, and the method 600 loops back to step 607, where the IE receives another burst from the MR. In other words, because the summed number ($E_d$) of bit errors (in the most recent $N_d$ voice frames) is below the fade detection threshold ($T_d$), this indicates that summed number ($E_d$) of bit errors is insufficient to indicate that a fade condition has been detected.

When the IE determines that the summed number of bit errors ($E_d$) is greater than the fade detection threshold ($T_d$), then a fade condition is detected, and the method 600 proceeds to step 685. In one embodiment, the fade detection threshold ($T_d$) can be set such that the IE detects fade when $E_d$ bit errors (or more) are detected in the last $N_d$ received voice frames. The IE starts its fade timer, at step 685, to begin timing the duration of the fade condition. The method 600 then loops back to step 607, where the IE receives another burst from the MR. In one implementation, when the IE detects the fade condition, the IE also transmits null voice frames and canned signaling information on the common air interface at step 687 and/or on the wired (or wireline) interface at step 689. For sake of brevity, the description of these steps will not be repeated.

Fade Recovery

When the IE determines that the fade timer is running (at step 672), the method 600 enters a fade recovery mode and proceeds to step 676, where the IE determines whether the summed number ($E_r$) of bit errors (in the most recent $N_r$ voice frames) is less than a fade recovery threshold ($T_r$).

When the IE determines that the current the summed number ($E_r$) of bit errors (in the most recent $N_r$ voice frames) is less than or equal to the fade recovery threshold ($T_r$), this indicates that the MR has recovered from the fade condition, and the method 600 proceeds to step 680, where the IE stops the fade timer to indicate that the fade condition has ended. The method 600 then loops back to step 607, where the IE receives another burst from the MR. For example, in one fade recovery implementation, the IE continues to maintain a running total of bit errors in the most recent $N_r$ voice frames while the fade timer is running, and can detect recovery from a fade condition when less than $T_r$ bit errors are detected in the most recent $N_r$ voice frames. This way, if the number of bit errors in the last $N_r$ voice frames drops below the fade recovery threshold ($T_r$), the fade timer is stopped/reset and the call is resumed. The number ($E_r$) of bit errors, the number of voice frames ($N_r$) and the fade recovery threshold ($T_r$) can be varied depending on the implementation and are chosen to balance the need to recover quickly if a viable call is still in progress with the need to recover only if the call can be sustained. The ability to select values for $E_d$, $T_d$, $N_d$, $E_r$, $T_r$ and $N_r$ allows for the difference between the criteria for fade detection and the criteria for fade recovery to be adjusted, which allows for a certain amount of hysteresis to be provided so that the fade timer is not constantly stopping and starting in marginal conditions. The hysteresis comes from the fact that $E_d$ is different than $E_r$, $T_d$ is different than $T_r$, and $N_d$ is different than $N_r$.

When the IE determines that the current summed number ($E_r$) of bit errors (in the most recent $N_r$ voice frames) is greater than (or equal to) the fade recovery threshold ($T_r$), this indicates that the MR has not recovered from the fade condition, and the method 600 proceeds to steps 687 and/or 689 (described above), and then loops back to step 607, where the IE receives another burst from the MR.

Processing when Burst is an IEMI Burst

When the IE determines that the burst is an IEMI burst, the method 600 proceeds to step 611, where the IE determines whether the IEMI burst is a Random Access SACCH (RA-SACCH) burst.

When the IE determines that the burst is a RA-SACCH burst, the method 600 proceeds to step 650, where the IE determines whether a fade timer has expired, as described above.

When the IE determines that the burst is not a RA-SACCH burst, the method 600 proceeds to step 613, where the IE decodes the IEMI (non-RA-SACCH burst or FACCH burst), as described above. The method 600 then proceeds to step 615, where the IE determines whether decoding of the IEMI was successful. When the IE determines that the decoding of the IEMI was not successful, the method 600 proceeds to step 650, where the IE determines whether the fade timer has expired, as described above. When the IE determines that the decoding of the IEMI was successful (as step 615), the method 600 proceeds to step 617, where the IE clears a voice frame error counter buffer (VFECB) that counts the number of bit errors in each voice frame. The VFECB is incremented as errors arrive during the superframe. If a valid IEMI arrives, the VFEBC is cleared to prevent detection of a fade condition.

From step 617, the method 600 proceeds to step 660 where the voice frame error count information is updated/cleared, and also proceeds to step 620, where the IE determines whether the IEMI is an end-of-call indicator (MAC_END_PTT PDU). When the IE determines that the IEMI is an end-of-call indicator (MAC_END_PPT PDU), the method 600 proceeds to step 690, where the IE performs processing necessary to end the call, as described above.

When the IE determines that the IEMI was successfully decoded and that the IEMI is not an end-of-call indicator (MAC_END_PTT PDU), fade recovery processing is performed at step 630. More specifically, the method 600 proceeds to step 630, where the IE determines whether the fade timer is running.

When the IE determines that the fade timer is running, the method 600 proceeds to step 680, where the IE stops and resets the fade timer. The method 600 then loops back to step 607, where the IE receives another burst from the MR.

When the IE determines that the fade timer is not running, the method 600 then loops back to step 607, where the IE receives another burst from the MR.

Thus, fade detection and fade recovery methods that are in accordance with the embodiments described with reference to FIG. 6 can use the number of bit errors in recent voice frames to provide rapid and reliable fade detection. Moreover, this fade detection mechanism also helps to identify when there is a mismatch in the voice channel scrambling sequence (used, for example, in project 25, Phase 2 compliant systems) between the IE and the MR so the call can be terminated. The disclosed voice frame-based fade recovery methods are also reliable and can allow for quick fade recovery from a fade condition thereby improving fade recovery times if the call is still viable. These methods are also resistant to detecting fades under fringe RF conditions.

Example Implementation of IE with Fade Protection

Figure 7:
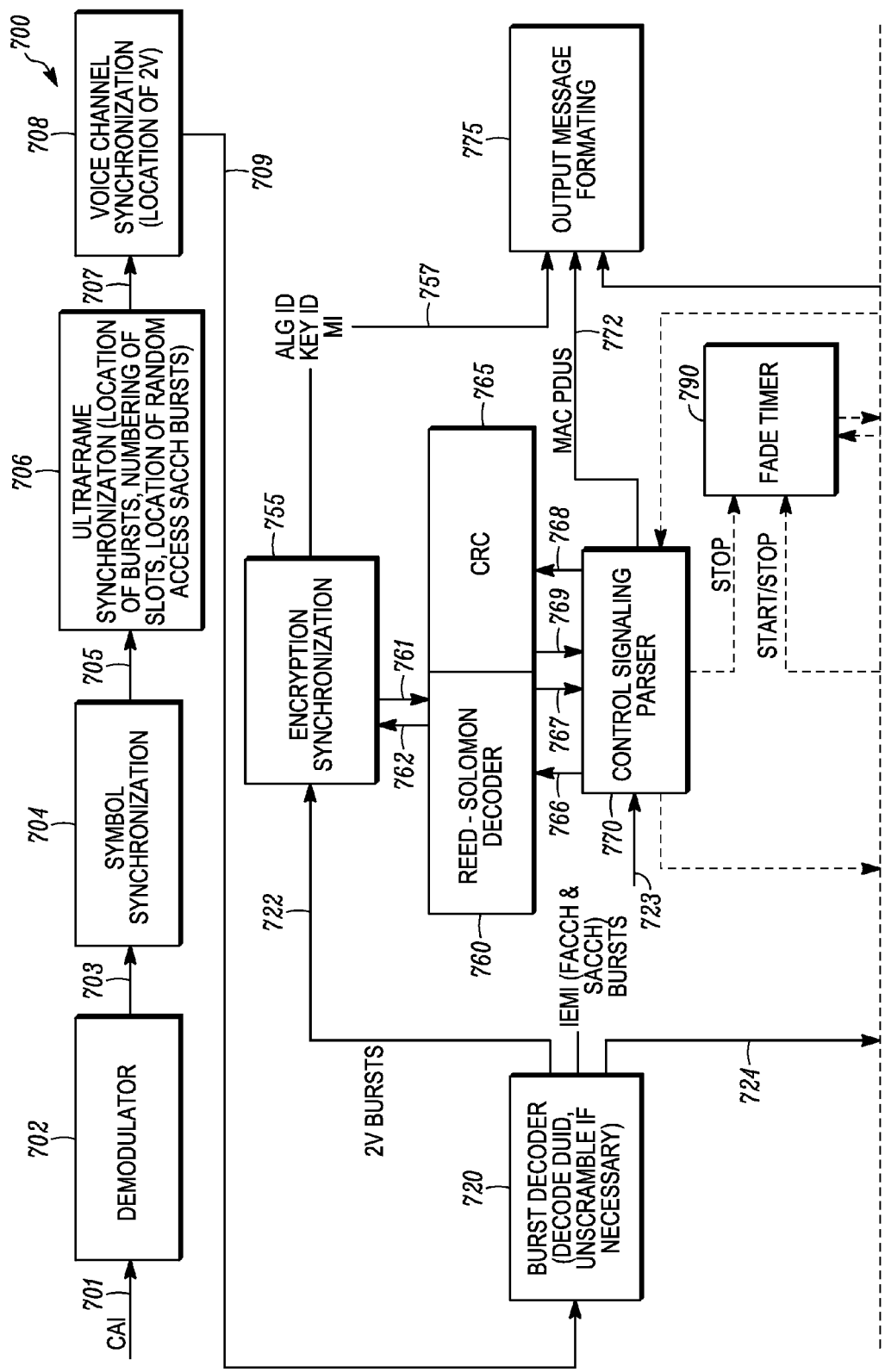
FIG. 7 is a block diagram illustrating portions of infrastructure equipment (IE) that implements fade protection methods in accordance with some embodiments.
Figure 7:
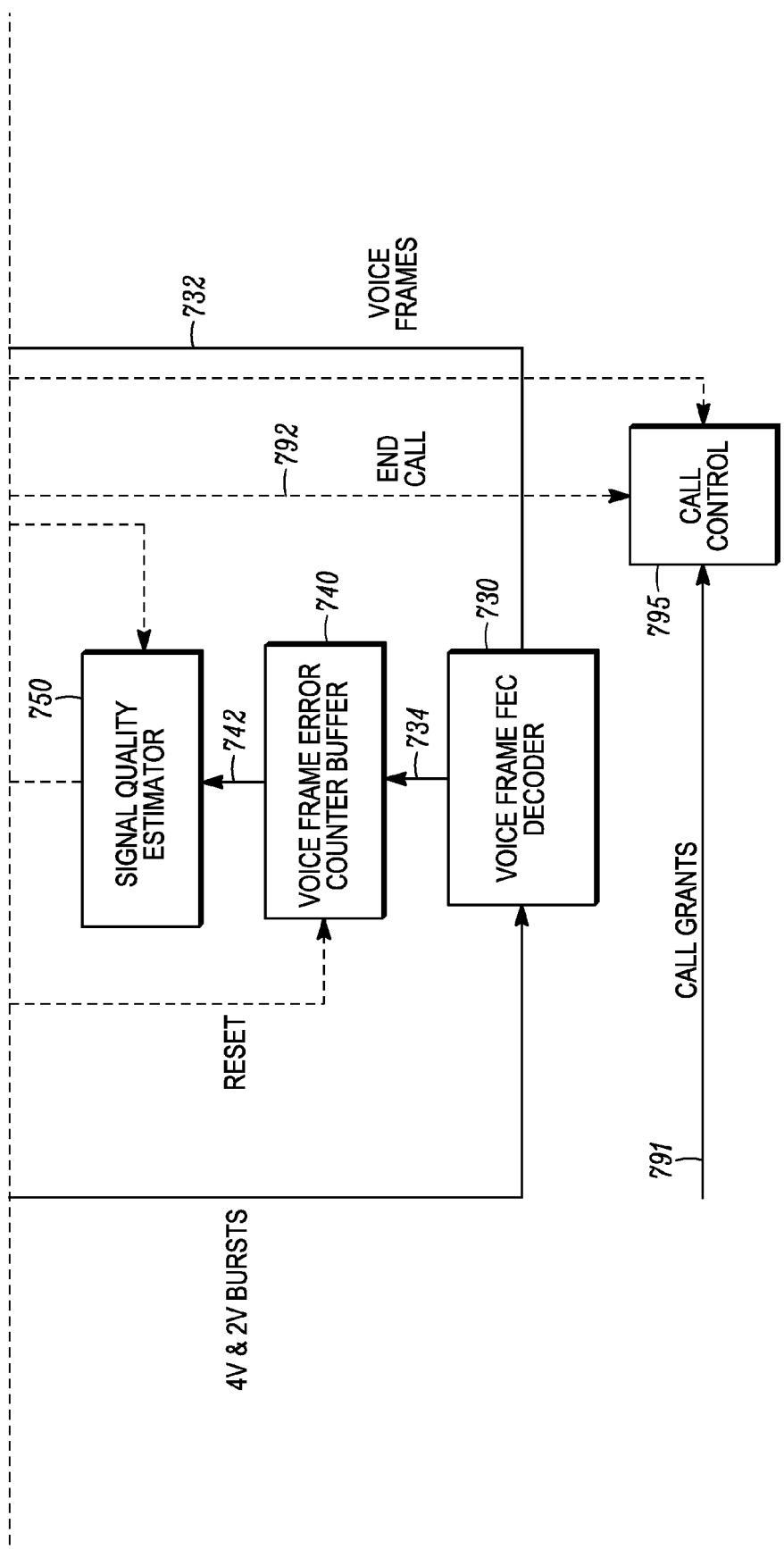

FIG. 7 is a block diagram illustrating portions of infrastructure equipment (IE) 700 that implements fade protection methods in accordance with some embodiments.

The IE 700 includes a demodulator 702, a symbol synchronization module 704, an ultraframe synchronization module 706, a voice channel synchronization module 708, a burst decoder 720, a voice frame parser module 725, a voice frame FEC decoder 730, a voice frame error counter buffer (VEFCB) module 740, a signal quality estimator module 750, an encryption synchronization module 755, a Reed-Solomon decoder module 760, a CRC module 765, a control signaling parser module 770, an output message formatting module 775, a fade timer 790, and a call control module 795. As will be described below, the VEFCB 740, the signal quality estimator module 750, the control signaling parser module 770 and the fade timer 790 are used to implement fade detection and fade recovery methods in accordance with the disclosed embodiments.

The demodulator 702 receives an RF signal 701 from a mobile radio over the common air interface (CAI), and demodulates the RF signal 701 to create a baseband signal 703. The symbol synchronization module 704 identifies the symbol boundaries and 703 and outputs symbols 705 that are processed by the ultraframe synchronization module 706.

The ultraframe synchronization module 706 determines the start of the ultraframe and outputs the bursts 707 to the voice channel synchronization module 708. The voice channel synchronization module 708 determines the location of the 2V voice burst in the superframe and outputs bursts and offset values 709 to the burst decoder 720.

The burst decoder 720 decodes each burst 709, and as part of the decoding process determines whether each burst 709 is an IEMI burst (i.e., a FACCH or a SACCH burst) or a voice burst. When the synchronized burst 709 is a voice burst, the burst decoder 720 further determines whether the synchronized burst 709 is a 2V or 4V burst, and when the burst is an IEMI burst, the burst decoder 720 further determines whether the burst is a SACCH burst or a FACCH burst. The burst decoder 702 also performs other functions including decoding DUIDs to determine the burst type, and unscrambling of the synchronized burst 709 if it is scrambled, etc.

Processing of IEMI Bursts

When the burst is an IEMI burst (FACCH or SACCH burst), it is provided to the control signaling parser module 770 for further processing. The control signaling parser module 770 is in communication with a Reed-Solomon decoder module 760 and a CRC module 765 that are used to determine whether the IEMI burst (FACCH or SACCH) can be successfully decoded. More specifically, the control signaling parser module 770 provides FEC encoded payload bits 766 to the Reed-Solomon decoder module 760, the Reed-Solomon decoder module 760 decodes the FEC encoded payload and provides error-corrected payload bits 767 to the control signaling parser module 770. The control signaling parser module 770 provides the error-corrected payload bits 768 to the CRC module 765, the CRC module 765 performs a cyclical redundancy check on the 768 to determine the payload status (successful/failed) 769, which it provides to the control signaling parser module 770. The control signaling parser module 770 can then evaluate whether the IEMI burst 723 is successfully decoded and valid.

When the burst is a RA-SACCH burst no action is taken. When the burst is a non-RA-SACCH burst, the control signaling parser module 770 decodes the IEMI, and determines whether decoding of the IEMI was successful. When the control signaling parser module 770 determines that the decoding of the IEMI was successful, the control signaling parser module 770 determines whether the IEMI is an end-of-call indicator (MAC_END_PTT PDU), and if so, provides a signal (not shown) to the call control module 795 so that it performs processing necessary to end the call.

When the control signaling parser module 770 determines that decoding of the IEMI was successful and that the IEMI does not include an end-of-call indicator (MAC_END_PPT PDU), then fade condition has ended and the MR has recovered from the fade. As such, the control signaling parser module 770 sends a stop command signal to stop the fade timer 790 and a reset command signal to the VEFCB 740 to clear the VEFCB 740.

The control signaling parser module 770 also extracts MAC protocol data units (PDUs) 772 from the IEMI bursts 723, and determines the offset and opcode.

Processing of Voice Bursts

The burst decoder 720 can determine whether a synchronized burst 709 is a 2V burst or a 4V burst. The 2V burst contains the Encryption Synchronization Signaling (ESS)-A; the 4V burst contains the ESS-B. As such, the encryption synchronization information is provided to the encryption synchronization module 755; the voice frames are sent to the voice frame FEC decoder 730 for further processing.

The encryption synchronization module 755 performs FEC decoding of the Encryption Synchronization Signaling (ESS). More specifically, the 2V bursts 722 (and up to four 4V bursts received previously from the same speech phase) are provided to the encryption synchronization module 755, which provides the FEC-encoded payload bits 761 to the Reed-Solomon decoder module 760, which decodes the 762 and provides the error-corrected ESS information 761 to the encryption synchronization module 755. The encryption synchronization module 755 generates or outputs encryption information 757 corresponding to each 2V burst. This encryption information includes an encryption algorithm identifier, encryption key identifier and MI, that are provided to the output message formatting module 775, and used to decrypt the voice frames 732.

The voice frame parser module 725 receives the 2V and 4V bursts 724 from the burst decoder module 720, parses the bursts 724 into encoded voice frames 727 that are provided to the voice frame FEC decoder 730.

The voice frame FEC decoder 730 FEC performs FEC as needed to generate decoded, error corrected voice frames 732. The voice frame FEC decoder 730 also provides bit error information 734 for each voice frame (regarding the number of bit errors that are detected in each voice frame) to the Voice frame error counter buffer (VEFCB) 740. For example, in one implementation, the FEC decoding can determine or "detect" FEC bit errors in the u0 voice codeword for each voice frame.

Voice Frame Error Counter Buffer (VEFCB)

The VEFCB 740 uses the FEC bit error information 734 for each voice frame to maintain and store a running total of bit errors in the last N voice frames. For instance, in one implementation as described above, the VEFCB 740 stores the number of FEC bit errors that are detected in each voice frame, and stores data regarding the number of bit errors in the u0 voice codeword/frame for each of the eighteen voice codewords/frames in each super frame as well as information regarding whether the IEMI for that voice codeword/frame was valid.

One possible implementation of the voice frame error counter buffer 660 is illustrated in Table 1 below.

TABLE 1

| Superframe | Slot | Voice Frame | u0 errors | Valid IEMI? |
|---|---|---|---|---|
| ... | ... | ... | ... | ... |
| 5 | 9 | 15 | 1 | — |
| 5 | 9 | 16 | 0 | — |
| 5 | 9 | 17 | 5 | — |
| 5 | 9 | 18 | 0 | — |
| 5 | 10 | — | — | yes |
| 6 | 1 | 1 | 0 | — |
| 6 | 1 | 2 | 1 | — |
| 6 | 3 | 3 | 3 | — |
| ... | ... | ... | ... | |

Table 1 shows an example of the u0 errors that can be detected at the end of superframe 5 and the beginning of superframe 6 for VCH 1. Voice frames 15-18 arrive in time slot 9 of superframe 5 in a 4V burst. An IEMI arrives in time slot 10 in a SACCH burst and is valid. Voice frames 1-2 arrive in time slot 1 of superframe 6 in a 2V burst. And voice frame 3 arrives in time slot 3 as part of a 4V burst (voice frames 4-6 are not shown). When the Signal Quality Estimator evaluates the number of errors against a threshold, the algorithm sums the number ($E_d$) of bit errors (in the most recent $N_d$ voice frames) and the number ($E_r$) of bit errors (in the most recent $N_r$ voice frames or codewords) up to the last valid IEMI received. For example, assuming that $N_d$ and $N_r$ are greater than 3, then at superframe 6, voice codeword 3, the number of bit errors ($E_d$) is 4 (3+1+0).

As described above, the VEFCB 740 can be reset when the control signaling parser module 770 signals that it should be reset (e.g., the VEFCB is "reset" by a "yes" entry in the "Valid IEMI?" column of Table 1). The VEFCB 740 provides voice frame error information 742 to the signal quality estimator module 750.

Signal Quality Estimator

The signal quality estimator module 750 uses the voice frame error information 742 provided from the VEFCB 740 to detect fade conditions and/or determine when the MR has recovered from a fade condition. When the signal quality estimator module 750 detects a fade condition it can issue a start command signal to the fade timer 790 to start the fade timer 790. As will also be described below, when the signal quality estimator module 750 determines that a fade condition is no longer occurring (e.g., that the MR has recovered from a fade condition), it can issue a stop and reset command signal to the fade timer 790 to stop and reset the fade timer 790.

Fade Timer

Among other things, the fade timer 790 measures the duration for which a fade condition has been detected without an intervening fade recovery event. The fade timer 790 can be in an off-state when a fade condition is not occurring and the fade timer is not running, and can be in an on-state when a fade condition is occurring and the fade timer is running. The on/off states of the fade timer 790 are controlled by start/stop/reset command signals received from the signal quality estimator module 750 or stop/reset command signal from the control signaling parser module 770.

The fade timer 790 can also be in an expired state when a fade condition has been detected and persists for a duration sufficient to indicate that the MR can not recover from the fade condition, and that the call should end even though an explicit notification has not been received from the MR. As such, if there is no fade recovery before the fade timer 790 expires (and hence no stop command signal sent to the fade timer 790), the fade timer 790 generates an end-of-call signal 792 and communicates it to the call control module 795 so that it performs processing necessary to end/terminate the call.

The call control module 795 keeps track of call state information (e.g., idle state, or active state including setup phase, speech phase, suspended phase (fade detected), hangtime phase and tear down phase), and can assign communication resources for a call in response to call grant instructions 791, and can end a call when instructed or when a non-recoverable fade condition persists for longer than a certain time. For example, when the fade timer 790 expires, it can issue a command 792 to the call control module 795 to end the call, and thereby free up communication resources dedicated to that call for use by other callers.

The output message formatting module 775 receives MAC PDUs 772 generated by the control signaling parser module 770, voice frames 732 from the voice frame FEC decoder 730 and encryption information 757 from the encryption synchronization module 755. Based on this information, the output message formatting module 775 can use techniques known to those skilled in the art to generate formatted voice frames (based on 2V or 4V bursts) that are formatted for communication over the common air interface or a wired connection.

Fade Detection and Fade Recovery Determinations at the Signal Quality Estimator Module As noted above, each time a voice burst (or non-IEMI burst) is received, fade detection and recovery processing begins. The signal quality estimator module 750 detects both fade conditions and recovery from such fade conditions, but uses different criteria for fade detection and fade recovery. In fade detection, the signal quality estimator module 750 determines the sum of the number ($E_d$) of bit errors in the most recent $N_d$ voice frames. By contrast, in fade recovery, the signal quality estimator module 750 determines the sum of the number ($E_r$) of bit errors in the most recent $N_r$ voice frames. Both sums can regularly computed in parallel by the signal quality estimator module 750.

To determine whether to perform fade detection processing or fade recovery processing, the signal quality estimator module 750 determines whether a fade timer is running. If so, fade detection processing is performed. If not, fade recovery processing is performed.

Fade Detection

When the signal quality estimator module 750 determines that the fade timer 790 is not running, fade detection is performed, and the signal quality estimator module 750 determines whether a current value of the summed number ($E_d$) of bit errors (in the most recent $N_d$ voice frames) is greater than a fade detection threshold ($T_d$). The number of voice frames ($N_d$) and the fade detection threshold ($T_d$) can be varied to balance the need for quick detection of fade conditions with the need to maintain a call without interruption in fringe coverage areas. As such, these parameters can be adjusted to balance two conflicting performance requirements (1) the time to leave the channel when the RF signal goes away, and (2) the probability the call should not be terminated when the RF signal is weak, but still usable.

When the current value of the summed number ($E_d$) of bit errors is less than or equal to the fade detection threshold ($T_d$), the summed number ($E_d$) of bit errors is insufficient to indicate that a fade condition has been detected. By contrast, when the summed number ($E_d$) of bit errors is greater than the fade detection threshold ($T_d$), then a fade condition is detected, and the signal quality estimator module 750 sends a start command signal to the fade timer 790 to start it to being timing the duration of the fade condition.

In one implementation, when the signal quality estimator module 750 detects the fade condition, the output message formatting module continues to transmit null voice frames on the common air interface and/or on the wired interface (not illustrated in FIG. 7).

Fade Recovery

While the fade timer is running, the signal quality estimator module 750 maintains a running total of bit errors in the most recent $N_r$ voice frames. When the fade timer 790 is running, then the signal quality estimator module 750 performs fade recovery processing, and determines whether the current summed number ($E_r$) of bit errors in the most recent $N_r$ voice frames is less than a fade recovery threshold ($T_r$). The number of voice frames ($N_r$) and the fade recovery threshold ($T_r$) can be varied to allow for a sliding fade recovery window to be implemented. For example, in one implementation, the signal quality estimator module 750 can detect recovery from a fade condition when less than $T_r$ bit errors are detected in the most recent $N_r$ voice frames, where the values of $T_r$ and $N_r$ are varied dynamically. These parameters can be chosen to balance the need to recover quickly if a viable call is still in progress with the need to recover only if the call can be sustained. In other words, these parameters can be adjusted to balance two conflicting performance requirements (1) the time to leave the channel when the RF signal goes away, and (2) the probability the call should not be terminated when the RF signal is weak, but still usable.

When the signal quality estimator module 750 determines that the current summed number ($E_r$) of bit errors is greater than (or equal to) the fade recovery threshold ($T_r$), this indicates that the MR has not recovered from the fade condition, the fade timer 790 continues to run, and the burst decoder 720 processes another burst from the MR.

By contrast, when the signal quality estimator module 750 determines that the current summed number ($E_r$) of bit errors (in the most recent $N_r$ voice frames) is less than or equal to the fade recovery threshold ($T_r$), this indicates that the MR has recovered from the fade condition. As such, the signal quality estimator module 750 sends a stop command signal to the fade timer to indicate that the fade condition has ended and that the fade timer 790 should be stopped and reset. The call is resumed and the next burst from the burst decoder 720 is then processed.

Thus, a number of fade protection methods are disclosed that are not only reliable, but are also fast and relatively insensitive to fringe RF conditions so that the IE can quickly detect conditions that indicate when a call has ended. This way, the call can be terminated quickly enough to maintain the desired quality of service while minimizing the probability that a viable call on the fringe of coverage is terminated.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method at an infrastructure equipment, the method comprising:
   receiving bursts of information from a mobile radio over a common air interface, wherein the bursts comprise voice bursts and signaling bursts, wherein each voice burst comprises at least one voice frame;
   decoding each voice burst received from the mobile radio;
   computing a number of bit errors in each voice frame of each voice burst, and storing the number of bit errors in each voice frame in a voice frame error counter buffer (VFECB);
   determining a first summed number of bit errors ($E_d$) that were present in a first number ($N_d$) of most recent voice frames stored in the VFECB;
   when a fade timer is determined not to be running and when a current value of the first summed number ($E_d$) is determined to be greater than a fade detection threshold ($T_d$), determining that a fade condition is detected and starting the fade timer to begin timing a duration of the fade condition such the expiration of the fade timer causes the call to be terminated; and
   when the fade timer is determined to be running and has not yet expired, and a signaling burst is successfully decoded to obtain signaling information, clearing the VFECB and stopping and resetting the fade timer.

2. A method according to claim 1, wherein the fade timer runs for a duration until the fade timer expires, wherein the fade timer starts whenever a fade condition is detected and continues to run unless the mobile radio recovers from the fade condition, and further comprising:
   determining, upon receiving each voice burst, whether the fade timer has expired, and terminating the call involving the mobile radio when the fade timer has expired.

3. A method according to claim 1, further comprising:
   transmitting, on at least one of a common air interface and a wired interface when the fade condition is detected, null voice frames and canned control signaling information until the mobile radio has either recovered from the fade condition or the fade timer stops.

4. A method according to claim 1, further comprising:
   determining a second summed number of bit errors ($E_r$) that were present in a second number ($N_r$) of most recent voice frames stored in the VFECB while the fade timer has been running; and
   when the fade timer is running and the second summed number of bit errors ($E_r$) that were present in the second number ($N_r$) of most recent voice frames is determined to be less than a fade recovery threshold ($T_r$), stopping the fade timer to indicate that the mobile radio has recovered from the fade condition and that the call is still in progress and will resume.

5. A method according to claim 4, further comprising:
   transmitting, on at least one of a common air interface and a wired interface when the second summed number is greater than or equal to the fade recovery threshold ($T_r$), null voice frames and canned control signaling information until the mobile radio has either recovered from the fade condition or the fade timer stops.

6. A method according to claim 1, wherein the signaling bursts further comprise Inbound Encoded MAC Information (IEMI) bursts that include the signaling information, wherein each IEMI burst comprises one of a fast access control channel (FACCH) burst, a random access slow access control channel (SACCH) burst or a non-random access SACCH burst, further comprising:
   determining whether each IEMI burst is one of a FACCH burst, a random access SACCH burst, or a non-random access SACCH burst;
   determining, with respect to each random access SACCH burst, whether the fade timer has expired, and terminating the call involving the mobile radio when the fade timer has expired.

7. A method according to claim 6, further comprising:
   decoding each IEMI burst that is determined to be a FACCH burst or a non-random access SACCH burst; and
   determining, with respect to each IEMI burst that is determined to be a FACCH burst or a non-random access SACCH burst, whether decoding of that FACCH burst or that non-random access SACCH burst was successful; and clearing the VFECB when decoding of that FACCH burst or that non-random access SACCH burst was successful.

8. A method according to claim 7, further comprising:

determining, with respect to each IEMI burst that is determined to be a FACCH burst or a non-random access SACCH burst when decoding of that FACCH burst or that non-random access SACCH burst was successful, whether that FACCH burst or that non-random access SACCH burst is an end-of-call indicator;

determining, when that FACCH burst or that non-random access SACCH burst is not an end-of-call indicator, whether a fade timer is running, and stopping the fade timer if the fade timer is determined to be running.

9. A method according to claim 7, further comprising:

determining, when decoding of that FACCH burst or that non-random access SACCH burst was not successful, whether the fade timer has expired, and terminating the call involving the mobile radio when the fade timer has expired.

10. A method, comprising:

receiving bursts of information as part of a call involving a mobile radio at infrastructure equipment over a common air interface, wherein each burst includes a data unit identifier (DUID) that indicates a burst type;

determining whether the DUID in each burst received from the mobile radio is valid or in error, wherein DUIDs that are in error are errored DUIDs;

incrementing a DUID error counter buffer (DECB) that stores a most recent number of the errored DUIDs each time a DUID is determined to be in error to maintain a DUID error count;

determining a first summed number ($D_d$) of errored DUIDs that were present in a first number ($K_d$) of most recent bursts stored in the DECB;

determining whether a fade timer is running, wherein the fade timer runs for a duration until the fade timer expires, wherein the fade timer starts whenever a fade condition is detected and continues to run unless the mobile radio recovers from the fade condition; and when the fade timer is not running, determining that a fade condition is detected when a current value of the first summed number ($D_d$) is determined to be greater than a fade detection threshold ($T_d$), and starting the fade timer to begin timing the duration of the fade condition.

11. A method according to claim 10, wherein the bursts comprise voice bursts and Inbound Encoded MAC Information (IEMI) bursts that include signaling information, and further comprising:

determining, upon receiving each voice burst, whether the fade timer has expired; and terminating the call involving the mobile radio when the fade timer has expired.

12. A method according to claim 10, further comprising:

determining a second summed number ($D_r$) of errored DUIDs that were present in a second number ($K_r$) of most recent bursts stored in the DECB while the fade timer has been running;

when the fade timer is running and a current value of the second summed number ($D_r$) of errored DUIDs that were present in the second number ($K_r$) of most recent bursts is determined to be less than a fade recovery threshold ($T_r$), stopping the fade timer to indicate that the mobile radio has recovered from the fade condition and that the call involving the mobile radio will continue;

transmitting, on at least one of a common air interface and a wired interface when the second summed number is greater than or equal to the fade recovery threshold ($T_r$), null voice frames and canned control signaling information until the mobile radio has either recovered from the fade condition or the fade timer stops.

13. A method according to claim 10, wherein the bursts comprise voice bursts and Inbound Encoded MAC Information (IEMI) bursts that include signaling information, wherein each of the IEMI bursts comprise either a fast access control channel (FACCH) burst, a random access slow access control channel (SACCH) burst or a non-random access SACCH burst, further comprising:

determining, with respect to each random access SACCH burst, whether the fade timer has expired; and terminating the call involving the mobile radio when the fade timer has expired.

14. A method according to claim 10, further comprising:

decoding each IEMI burst that is determined to be a FACCH burst or a non-random access SACCH burst; and determining, with respect to each IEMI burst that is determined to be a FACCH burst or a non-random access SACCH burst, whether decoding of that FACCH burst or that non-random access SACCH burst was successful; and clearing the DUID error counter buffer when decoding of that FACCH burst or that non-random access SACCH burst was successful.

15. A method according to claim 14, further comprising:

determining, with respect to each IEMI burst that is determined to be a FACCH burst or a non-random access SACCH burst when decoding of that FACCH burst or that non-random access SACCH burst was successful, whether that FACCH burst or that non-random access SACCH burst is an end-of-call indicator;

determining, when that FACCH burst or that non-random access SACCH burst is not an end-of-call indicator, whether a fade timer is running, and stopping the fade timer if the fade timer is determined to be running.

16. A method according to claim 14, further comprising:

determining, when decoding of that FACCH burst or that non-random access SACCH burst was not successful, whether the fade timer has expired; and terminating the call involving the mobile radio when the fade timer has expired.

17. A method, comprising:

receiving bursts of information as part of a call involving a mobile radio at infrastructure equipment over a common air interface, wherein each burst includes a data unit identifier (DUID) that indicates a burst type;

starting a fade timer, when a fade condition is detected, to begin timing the duration of the fade condition, wherein the fade timer runs for a duration until the fade timer expires, wherein the fade timer starts whenever a fade condition is detected and continues to run unless the mobile radio recovers from the fade condition;

determining whether the DUID in each burst received from the mobile radio is valid or in error, wherein DUIDs that are in error are errored DUIDs;

incrementing a DUID error counter buffer (DECB) that stores a most recent number of the errored DUIDs each time a DUID is determined to be in error to maintain a DUID error count;

determining a summed number ($D_r$) of errored DUIDs that were present in a number ($K_r$) of most recent bursts stored in the DECB while the fade timer has been running; and determining whether the fade timer is running; and when the fade timer is running and a current value of the summed number ($D_r$) of errored DUIDs that were present in a number ($K_r$) of most recent bursts is determined to be less than a fade recovery threshold ($T_r$), stopping the fade timer to indicate that the mobile radio has recovered from the fade condition and that the call involving the mobile radio will continue; and transmitting, on at least one of a common air interface and a wired interface when the summed number is greater than or equal to the fade recovery threshold ($T_r$), null voice frames and canned control signaling information until the mobile radio has either recovered from the fade condition or the fade timer stops.

18. A method according to claim 17, wherein the bursts comprise voice bursts and Inbound Encoded MAC Information (IEMI) bursts that include signaling information, and further comprising:

determining, upon receiving each voice burst, whether the fade timer has expired; and terminating the call involving the mobile radio when the fade timer has expired.

19. A method according to claim 17, wherein the bursts comprise voice bursts and Inbound Encoded MAC Information (IEMI) bursts that include signaling information, wherein each of the IEMI bursts comprise either a fast access control channel (FACCH) burst, a random access slow access control channel (SACCH) burst or a non-random access SACCH burst, further comprising:

determining, with respect to each random access SACCH burst, whether the fade timer has expired; and terminating the call involving the mobile radio when the fade timer has expired.

20. A method according to claim 17, further comprising:

decoding each IEMI burst that is determined to be a FACCH burst or a non-random access SACCH burst;

determining, with respect to each IEMI burst that is determined to be a FACCH burst or a non-random access SACCH burst, whether decoding of that FACCH burst or that non-random access SACCH burst was successful;

clearing the DUID error counter buffer when decoding of that FACCH burst or that non-random access SACCH burst was successful;

determining, with respect to each IEMI burst that is determined to be a FACCH burst or a non-random access SACCH burst when decoding of that FACCH burst or that non-random access SACCH burst was successful, whether that FACCH burst or that non-random access SACCH burst is an end-of-call indicator;

determining, when that FACCH burst or that non-random access SACCH burst is not an end-of-call indicator, whether a fade timer is running, and stopping the fade timer if the fade timer is determined to be running;

determining, when decoding of that FACCH burst or that non-random access SACCH burst was not successful, whether the fade timer has expired; and terminating the call involving the mobile radio when the fade timer has expired.

\* \* \* \* \*

UNITED STATES PATENT AND TRADEMARK OFFICE
CERTIFICATE OF CORRECTION

| | | |
|---|---|---|
| PATENT NO. | : 8,644,295 B2 | Page 1 of 1 |
| APPLICATION NO. | : 12/771139 | |
| DATED | : February 4, 2014 | |
| INVENTOR(S) | : Streed et al. | |

It is certified that error appears in the above-identified patent and that said Letters Patent is hereby corrected as shown below:

In the claims

In Column 30, Line 9, in Claim 1, delete "such the" and insert -- "such that --, therefor.

Signed and Sealed this
Third Day of May, 2016

Michelle K. Lee
*Director of the United States Patent and Trademark Office*